United States Patent
Bonslaver et al.

(10) Patent No.: US 12,311,885 B2
(45) Date of Patent: May 27, 2025

(54) ADJUSTABLE VEHICLE PLATFORM

(71) Applicant: Orion Outdoors LLC, Birdsboro, PA (US)

(72) Inventors: Nathan Bonslaver, Birdsboro, PA (US); Kevin Gulick, Pottstown, PA (US); Robert Miller, Douglassville, PA (US)

(73) Assignee: Orion Outdoors LLC, Birdsboro, PA (US)

( * ) Notice: Subject to any disclaimer, the term of this patent is extended or adjusted under 35 U.S.C. 154(b) by 262 days.

(21) Appl. No.: 18/049,940

(22) Filed: Oct. 26, 2022

(65) Prior Publication Data

US 2023/0126769 A1    Apr. 27, 2023

Related U.S. Application Data

(60) Provisional application No. 63/263,025, filed on Oct. 26, 2021.

(51) Int. Cl.
*B60R 5/04* (2006.01)
*B60N 2/34* (2006.01)

(52) U.S. Cl.
CPC .............. *B60R 5/045* (2013.01); *B60N 2/34* (2013.01)

(58) Field of Classification Search
CPC ... B60R 5/045; B60R 5/04; B60R 2011/0003; B60R 2011/0036; B60N 3/001; B60N 3/0008
USPC ............ 296/37.1, 37.5, 37.8, 37.16, 66, 69, 296/24.33; 108/44; 5/118
See application file for complete search history.

(56) References Cited

U.S. PATENT DOCUMENTS

| | | | | |
|---|---|---|---|---|
| 2,711,545 | A | * | 6/1955 | Moore .................... B60N 2/345 5/118 |
| 3,063,064 | A | * | 11/1962 | Mace .................... B60N 2/2854 108/166 |
| 3,604,022 | A | * | 9/1971 | Smith ...................... B60N 2/36 5/118 |
| 4,443,034 | A | * | 4/1984 | Beggs .................. B60N 2/3011 296/37.16 |
| 5,505,513 | A | * | 4/1996 | Carsner .................... B60N 2/34 5/118 |
| 8,366,165 | B2 | * | 2/2013 | Maximilien ........... A47C 17/80 5/118 |

(Continued)

*Primary Examiner* — Amy R Weisberg
*Assistant Examiner* — Denise Lynne Esquivel
(74) *Attorney, Agent, or Firm* — Penn State Dickinson Law IP Clinic; Jordan Henegar; Jonathan D'Silva

(57) ABSTRACT

A platform for the rear of a vehicle has a rear portion positionable within a trunk space and comprises a rear upper platform surface raised by at least one rear support. The rear portion has a first width and a first length extending across the trunk surface. A front portion comprises a front upper platform surface raised by at least one front support. The front portion has a second length and a second width extending across the folded rear seat surface. The front support rests upon the folded rear seat surface and is positionable along the second length so that the front upper platform surface and the rear upper platform surface combine to create an approximately flat continuous surface. A wing is mounted to the front portion that adjusts the width of the front portion by angling to a maximum of 180 degrees relative to the front upper platform surface.

10 Claims, 25 Drawing Sheets

(56) References Cited

U.S. PATENT DOCUMENTS

2021/0146844 A1* 5/2021 Smith .................... B60R 5/045
2022/0202194 A1* 6/2022 Cervantes ............. A47C 19/12

* cited by examiner

ADJUSTABLE VEHICLE PLATFORM

CROSS REFERENCE TO RELATED APPLICATIONS

This application is a continuation of and claims priority under 35 U.S.C. § 120 to U.S. provisional application Ser. No. 63/263,025, filed Oct. 26, 2021, entitled "ADJUSTABLE VEHICLE SLEEPING PLATFORM," which is herein incorporated by reference in its entirety.

BACKGROUND OF THE INVENTION

The ability for someone to travel and be able to sleep in their vehicle without giving up storage provides a sense of freedom and exploration that is different from traditional tent camping. Being able to sleep within their vehicle also adds a sense of security while exploring in a cost conscientious manner. Currently, there are few manufacturers that fabricate platforms for individuals to use in their vehicle that can support sleeping and storage. Current solutions are bulky, heavier than necessary, and limited in versatility and function. If an individual wants to experience car camping, they must dedicate a significant amount of time and resources to measuring their vehicle, researching and developing designs, and constructing a platform for sleeping and storage themselves. However, most individuals do not possess the do-it-yourself knowledge or expensive tools required, nor the time or interest to complete such a project. Current prefabricated options do not offer widespread compatibility across different vehicle makes and models. Current options also offered limited functionality, including difficult to access storage space, structural components that interfere with storage space, and designs that are not optimized for the vehicle's interior. Moreover, current do-it-yourself options offer no ability to collapse from their largest form and do not offer easy access to storage space underneath.

Therefore, there is a growing demand for a vehicle platform that provides ample and accessible storage space, is lightweight and collapsible, easily assembled, compatible with a variety of vehicles, and allows for individual(s) to sleep on top of it.

SUMMARY OF THE INVENTION

What is presented is a platform for the rear of a vehicle, wherein the vehicle comprises a trunk space and rear seats that are foldable. Trunk spaces typically have a flat trunk surface and the rear seats fold down to create an approximately flat folded rear seat surface. The platform comprises a rear portion positionable within the bunk space. The rear portion comprises a rear upper platform surface raised by at least one rear support under it. The rear portion has a first width and a first length that each extend across the trunk surface. The platform has a front portion that comprises a front upper platform surface raised by at least one front support under the front upper platform surface. The front portion has a second length and a second width that each extend across the folded rear seat surface. The front support rests upon the folded rear seat surface and is positionable along the second length so that the front upper platform surface and the rear upper platform surface combine to create an approximately flat continuous surface. At least one wing is mounted to the front portion. The wing adjusts the width of the front portion by angling to a maximum of 180 degrees relative to the front upper platform surface.

In some embodiments, the rear support is a leg, a pole, a board, a caster, or any other object that can fit under and support the rear portion of the platform. The front portion and the rear portion are detachably connected to each other with any usable connectors such as hinges, pins, and so on. The detachable connection allows for the front portion and the rear portion to be disassembled when not in use. Moreover, the front portion can be placed on top of the rear portion as storage in the trunk space when not in use and instead allows the rear seats to be used. In other embodiments, the front portion and the rear portion are permanently attached to each other, which accommodates quick use and effortless use during travel. In some embodiments, the first length is adjustable and the slats are perpendicular to the rear supports to create the flat rear upper platform surface. The slats are removable to accommodate for the adjustment of the rear supports and make the rear portion longer or shorter to accommodate trunk spaces of varying lengths. In some embodiments, the wing is supported by at least one front support of the front portion. The front support can be anything that fits under and support the front portion, even the interior parts of the vehicle can act as a front support not attached to the platform.

In some embodiments, the platform for the rear of a vehicle, wherein the vehicle comprises a trunk space and rear seats that are foldable. Trunk spaces typically have a flat trunk surface and the rear seats fold down to create an approximately flat folded rear seat surface. The platform comprises a rear portion positionable within the trunk space. The rear portion comprises a rear upper platform surface raised by at least one rear support under it. The rear portion has a first width and a first length that each extend across the trunk surface. The platform has a front portion that comprises a front upper platform surface raised by at least one front support under the front upper platform surface. The front portion has a second length and a second width that each extend across the folded rear seat surface. The front support rests upon the folded rear seat surface and is positionable along the second length so that the front upper platform surface and the rear upper platform surface combine to create an approximately flat continuous surface. No wing portion is mounted to the front portion of the platform in these embodiments.

In some embodiments, the rear support is a leg, a pole, a board, a caster, or any other object that can fit under and support the rear portion of the platform. The front portion and the rear portion are detachably connected to each other with any usable connectors such as hinges, pins, and so on. The detachable connection allows for the front portion and the rear portion to be disassembled when not in use. Moreover, the front portion can be placed on top of the rear portion as storage in the trunk space when not in use and instead allows the rear seats to be used. In other embodiments, the front portion and the rear portion are permanently attached to each other, which accommodates quick use and effortless use during travel. In some embodiments, the first length is adjustable and the slats are perpendicular to the rear supports to create the flat rear upper platform surface. The slats are removable to accommodate for the adjustment of the rear supports and make the rear portion longer or shorter to accommodate trunk spaces of varying lengths.

The features, functions, and advantages of the present invention can be achieved independently in various embodiments of the present inventions or may be combined in yet other embodiments. Although specific features, structures, embodiments, methods, objectives, benefits, advantages, functionality, and applications may have been disclosed, it will be understood by those having skill in the art that changes, including but not limited to, variations, modifications, combinations, alterations, omissions, and various other applications, will occur to those of ordinary skill in the art and such changes will be made without departing from the spirit and the scope of the invention as claimed. It should also be understood by anyone who reads this document that the terminology and phraseology used herein are for the purpose of description and should not be considered limiting.

BRIEF DESCRIPTION OF THE DRAWINGS

The features and the inventive aspects of the present invention will become more apparent upon reading the following detailed description, and drawings, of which the following is a brief description.

DETAILED DESCRIPTION OF THE INVENTION

Figure 1:
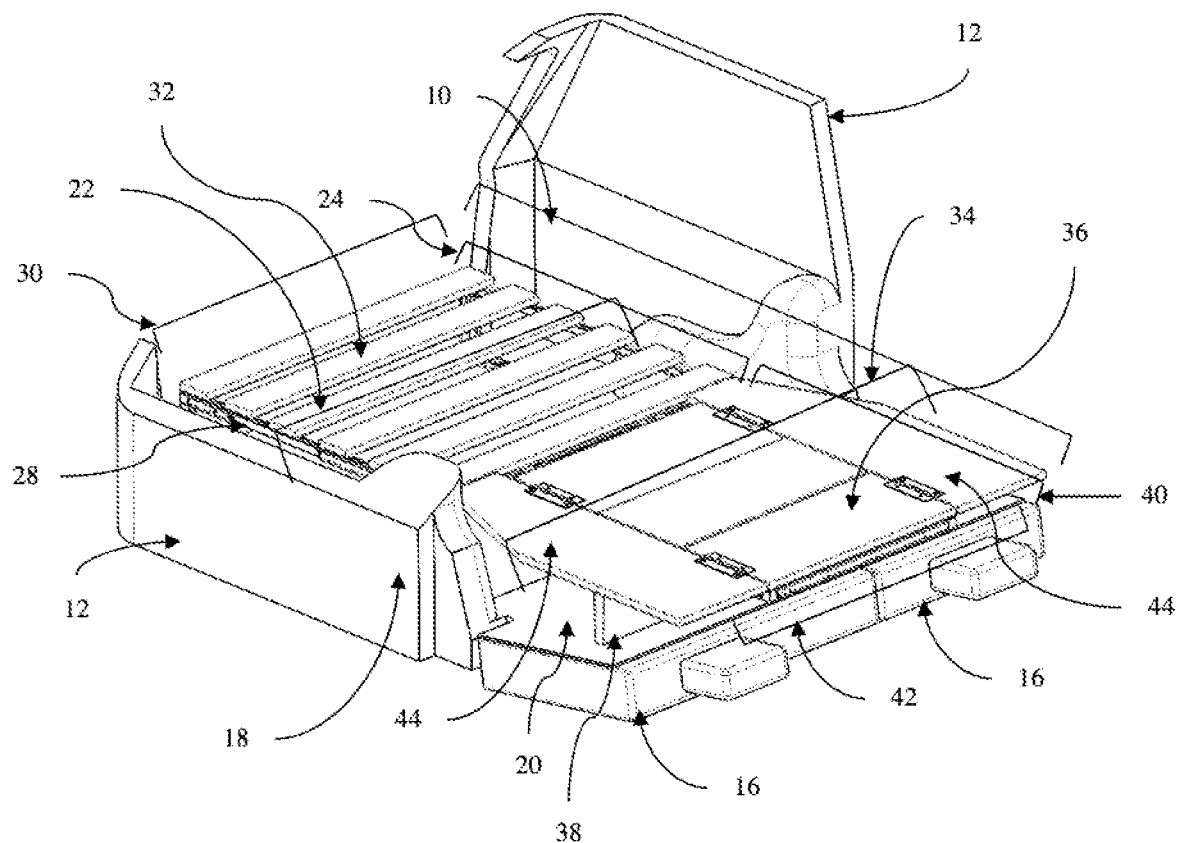
FIG. 1 illustrates one embodiment of the adjustable platform installed in the trunk space and on the folded rear seats of a vehicle.
Figure 2:
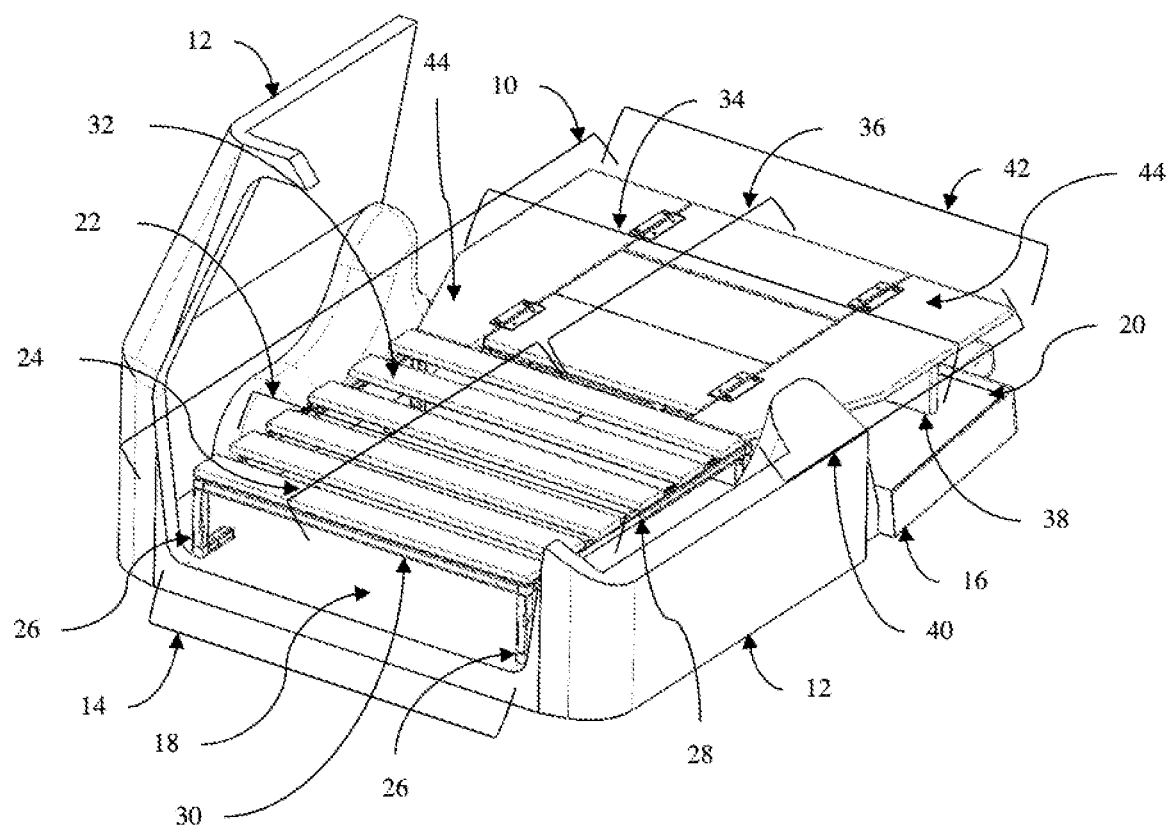
FIG. 2 illustrates another view of the adjustable platform of FIG. 1 installed in the trunk space.

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

Some users of vehicles who take overnight trips prefer to sleep in their vehicles rather than spend money for a hotel or other accommodation or just to feel like they are sleeping outdoors. What is presented is a platform that may be installed in the rear of a vehicle that makes the sleeping experience more comfortable and storage still possible. As shown in FIGS. 1 through 4, the platform 10 is installed in the rear of a vehicle 12. The figures show cutouts of the vehicle 12 as the platform 10 may be installed in any vehicle that has a trunk and seats that can be folded. The vehicle 12 comprises a trunk space 14 and rear seats 16 that are foldable, the trunk space 14 has a flat trunk surface 18, and the rear seats 16 fold down to create an approximately flat folded rear seat surface 20.

As best understood by comprising FIGS. 1 through 7, the platform 10 comprises a rear portion 22 that is positionable within the trunk space 14 and further comprises a rear upper platform surface 24 raised by at least one rear support 26 underneath the rear upper platform surface 24. The rear support 26 could be a leg, a pole, a board, a caster, or any other device or structure that would raise the rear upper platform surface 24 above the trunk space 14. This creates a storage area under the rear portion 22. The number and distribution of rear supports 26 could vary depending on the embodiment. In the figures there are four rear supports 26 that are placed in the four corners of the rear portion 22.

Figure 7:
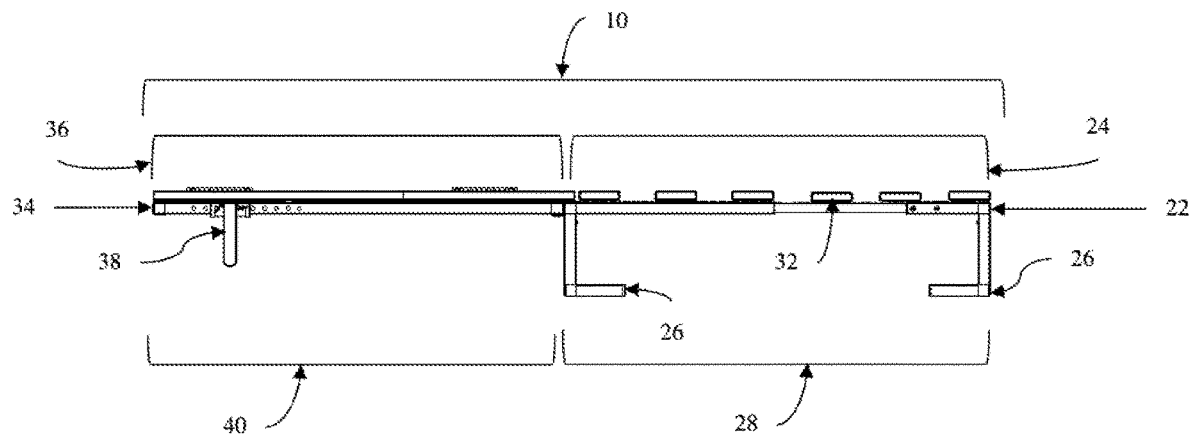
FIG. 7 illustrates a horizontal side view of the adjustable platform in FIG. 5 with shorter front supports.
Figure 7A:
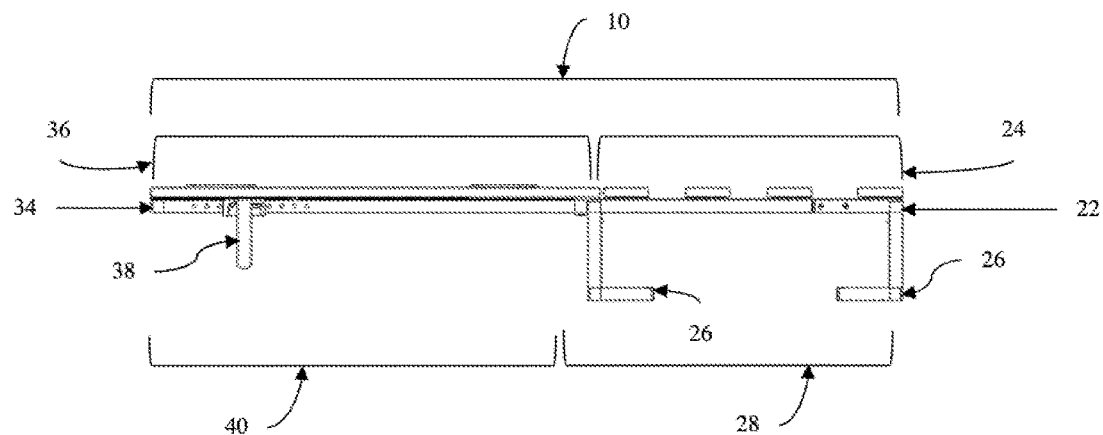
FIG. 7A illustrates a horizontal side view of the adjustable platform in FIG. 5 showing the adjustable first length by removing slats shortening the position of the rear supports.
Figure 18:
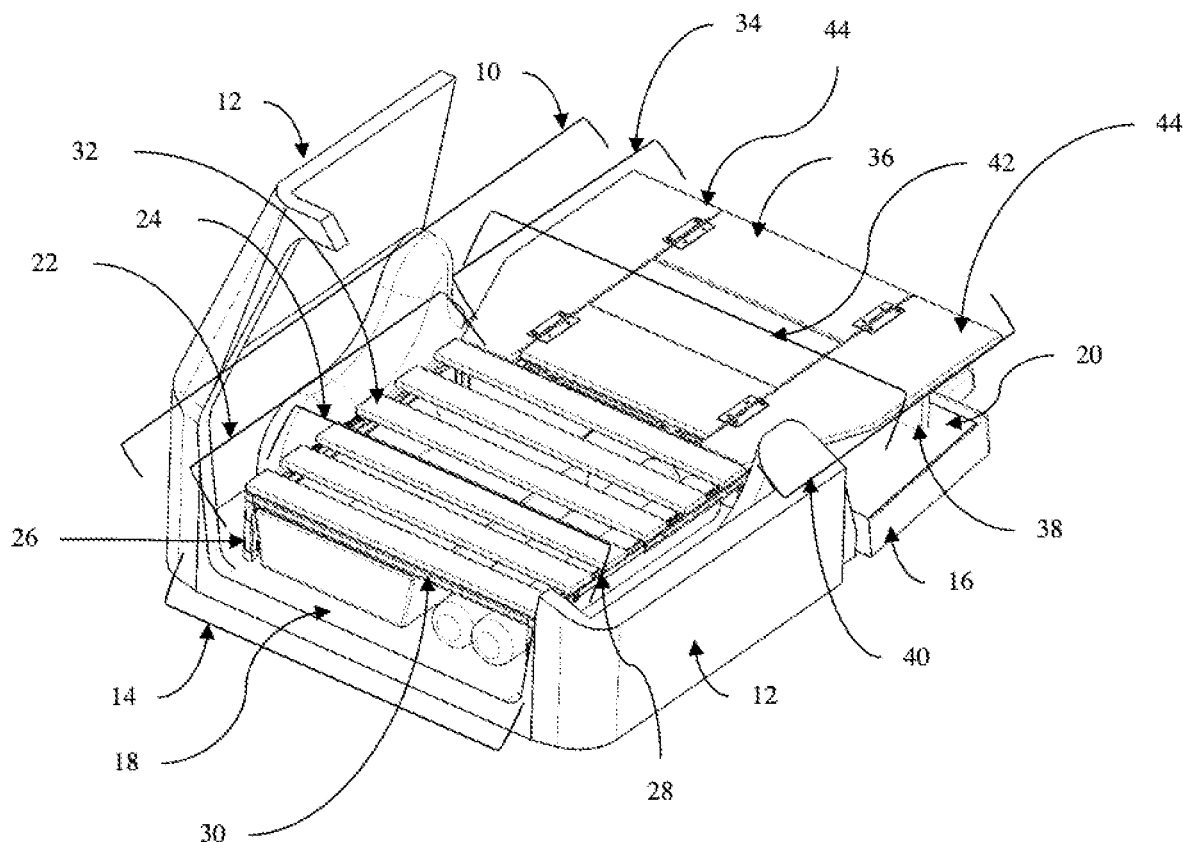
FIG. 18 illustrates another view of the adjustable platform of FIG. 2 installed in the trunk space, but with objects stored underneath the platform.
Figure 19:
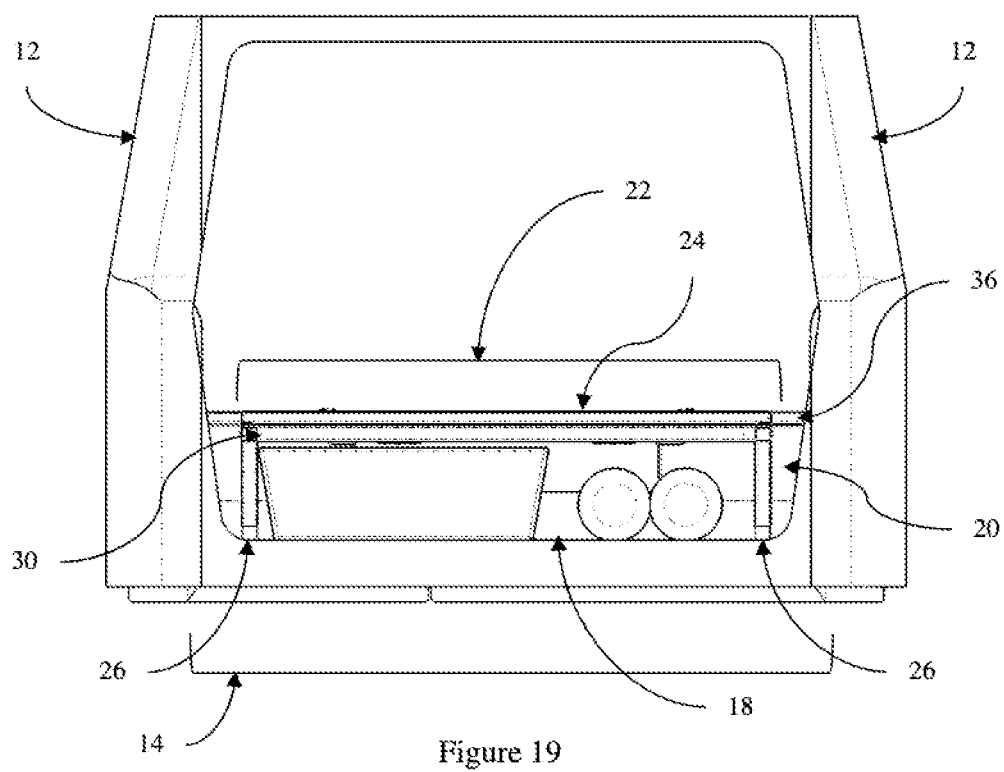
FIG. 19 illustrates another view of the adjustable platform of FIG. 18 with objects stored underneath the platform.
Figure 20:
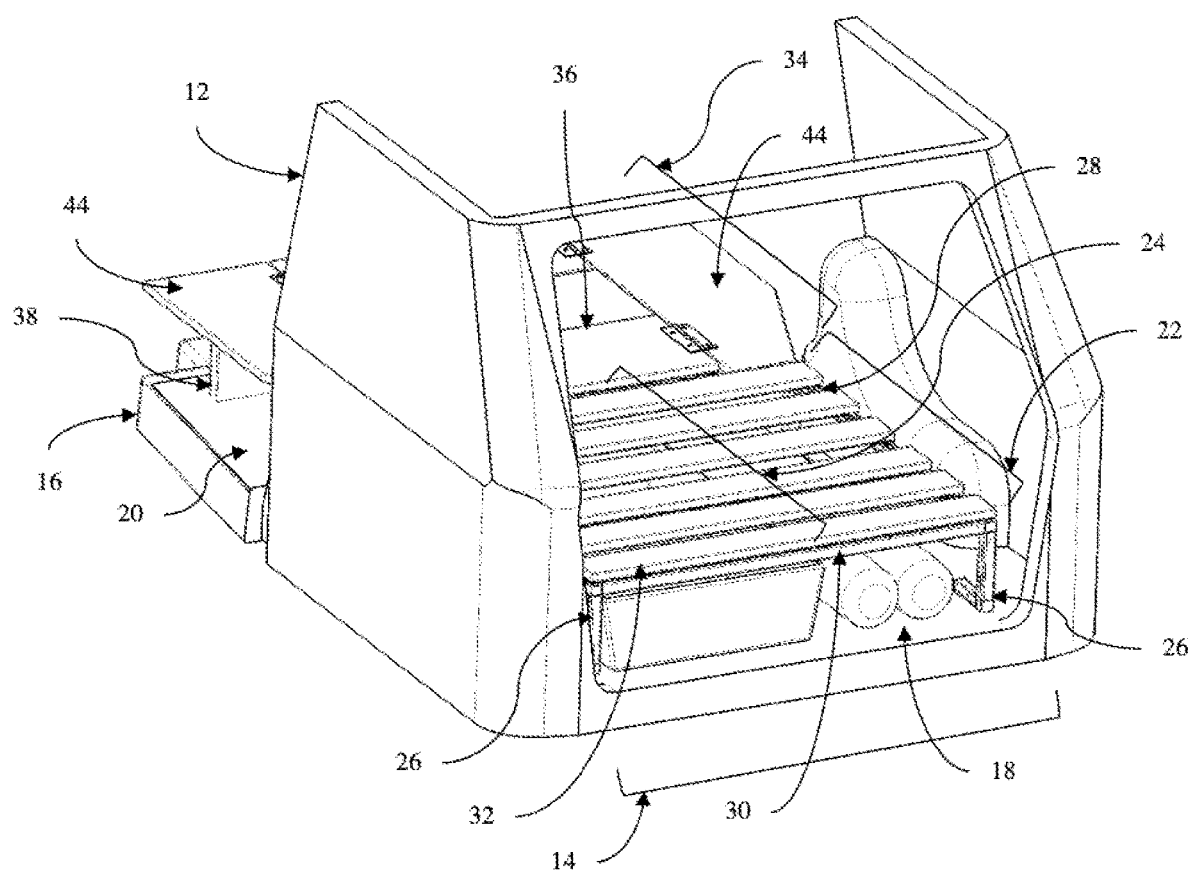
FIG. 20 illustrates another view of the adjustable platform of FIG. 18 with objects stored underneath the platform.

The rear portion 22 has a first length 28 and a first width 30 that can extend across the trunk surface 18. The rear portion 22 has a first length 28 that is adjustable. In the embodiments shown in the figures, slats 32 are used to extend the workable surface of the rear portion 22. FIG. 7A shows the slats 32 are removable and that the first length 28 is adjustable to have the rear portion 22 cover more or less of the trunk surface 18. The adjustability allows for the platform 10 to be used in vehicles with trunks with different dimensions and the raised aspect of the rear portion 22 allows for storage. FIGS. 18 through 20 demonstrate the use of the platform 10 with objects stored underneath the rear portion 22. People do not need to choose between the option to sleep in their vehicle 12 and lose interior storage space as the price because the platform 10 allows for both at the same time.

Figure 3:
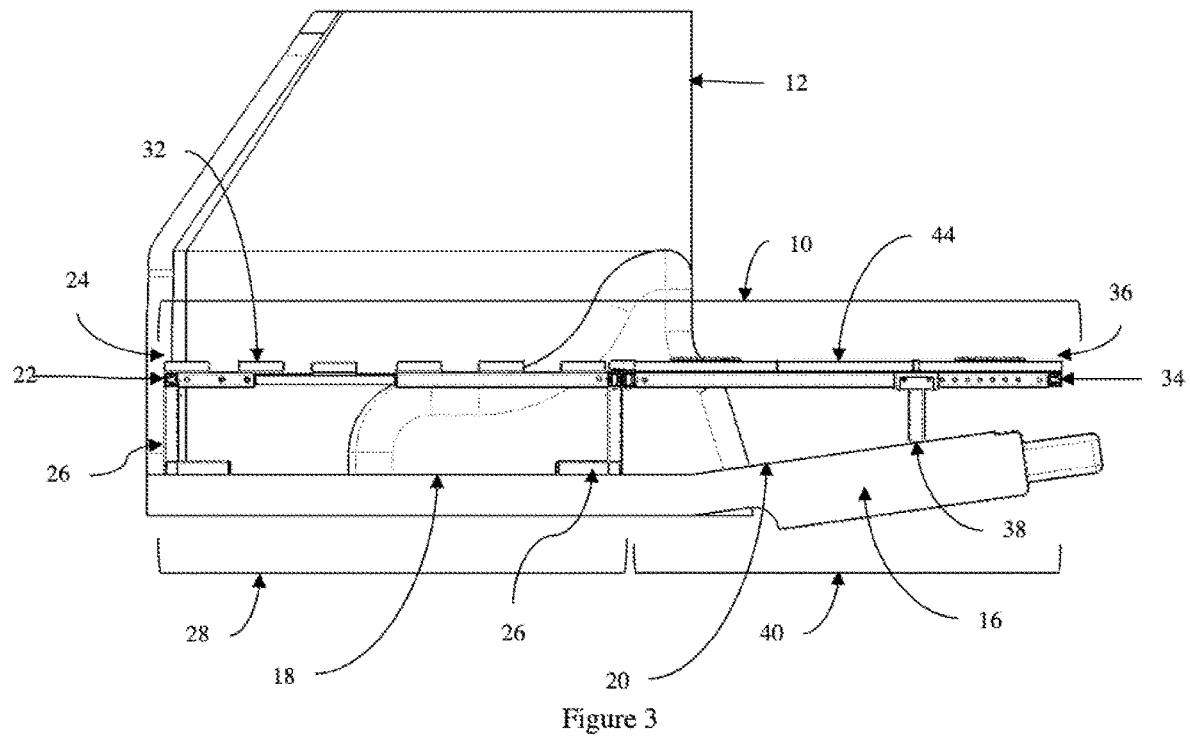
FIG. 3 illustrates another view of the adjustable platform of FIG. 1 installed in the trunk space, but from a side, horizontal perspective and with the front support closer to the trunk space than the headrest of the folded, angled rear seats.
Figure 4:
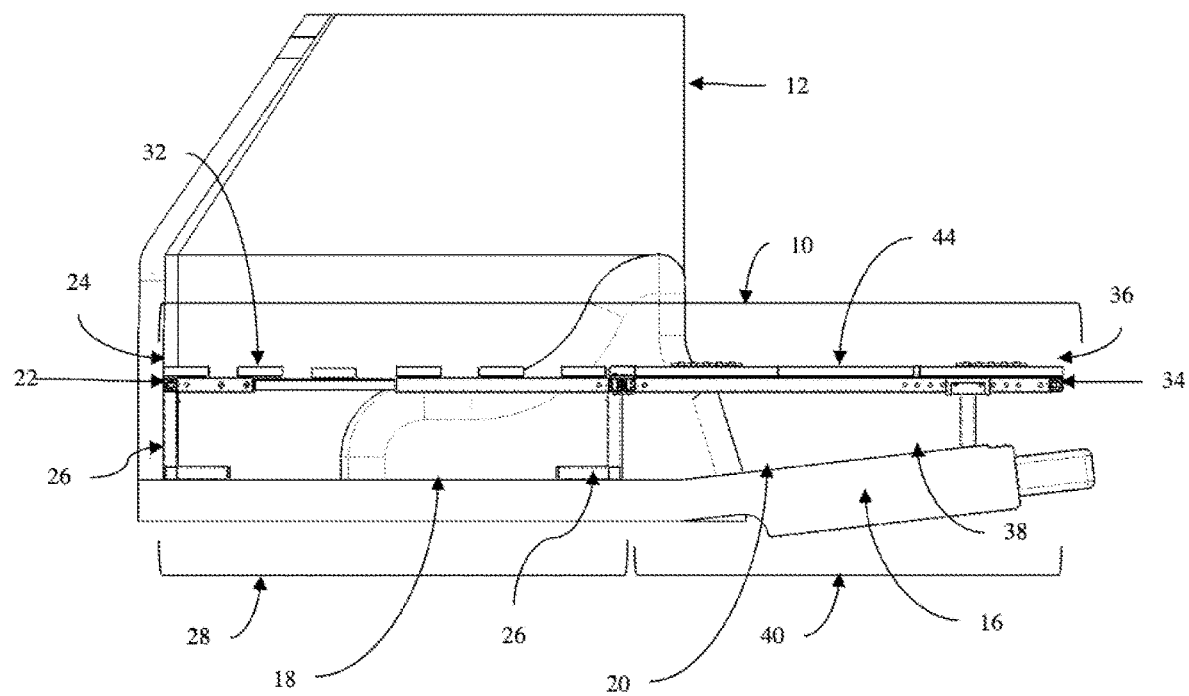
FIG. 4 illustrates the same view of the adjustable platform of FIG. 3 installed in the trunk space, but with the front support closer to the headrest of the folded, angled rear seats than the trunk space.
Figure 5:
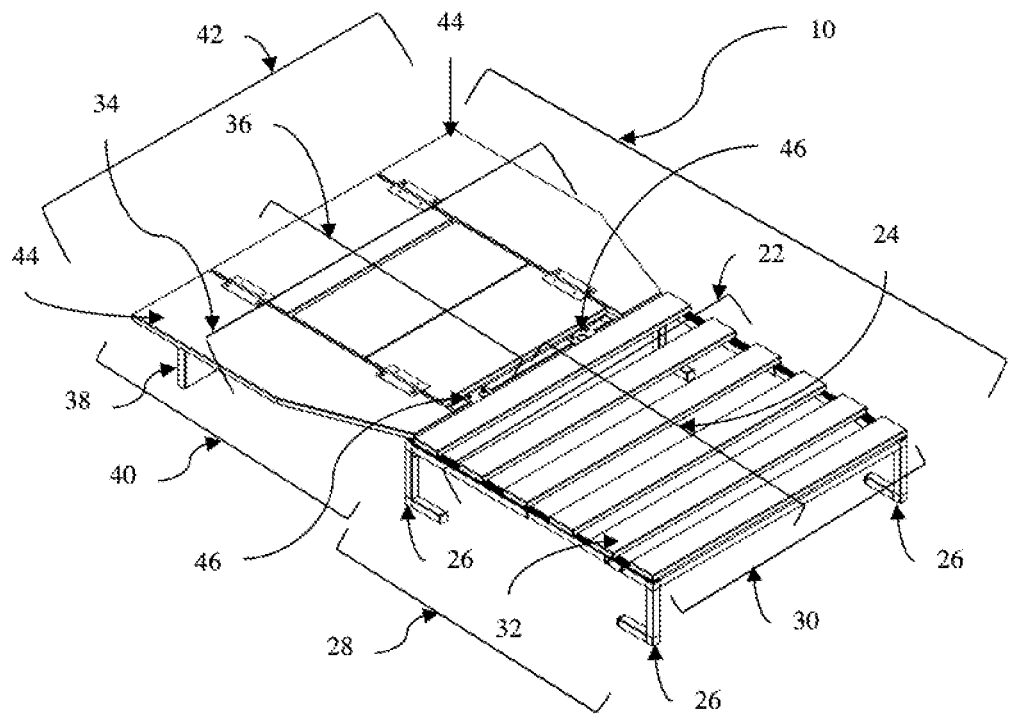
FIG. 5 illustrates one embodiment of the adjustable platform with connectors allowing the rear portion and the front portion to be separated.
Figure 6:
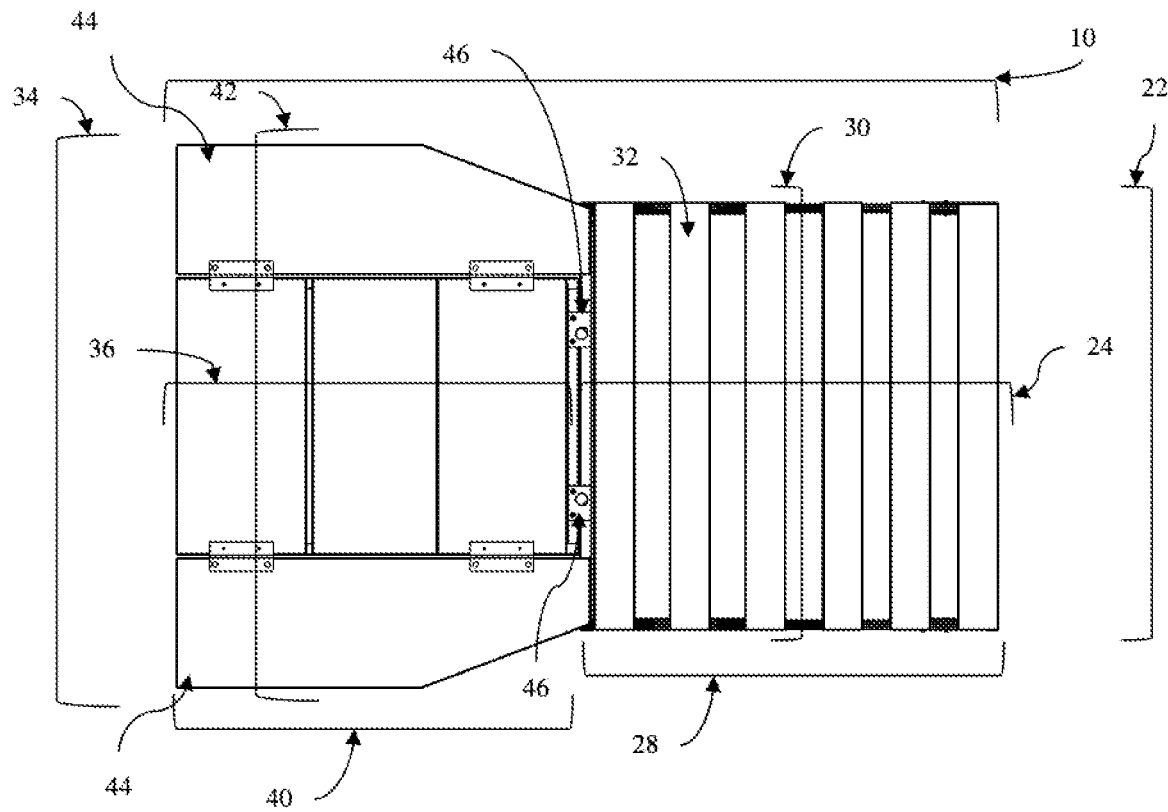
FIG. 6 illustrates another view of the adjustable platform in FIG. 5.
Figure 23:
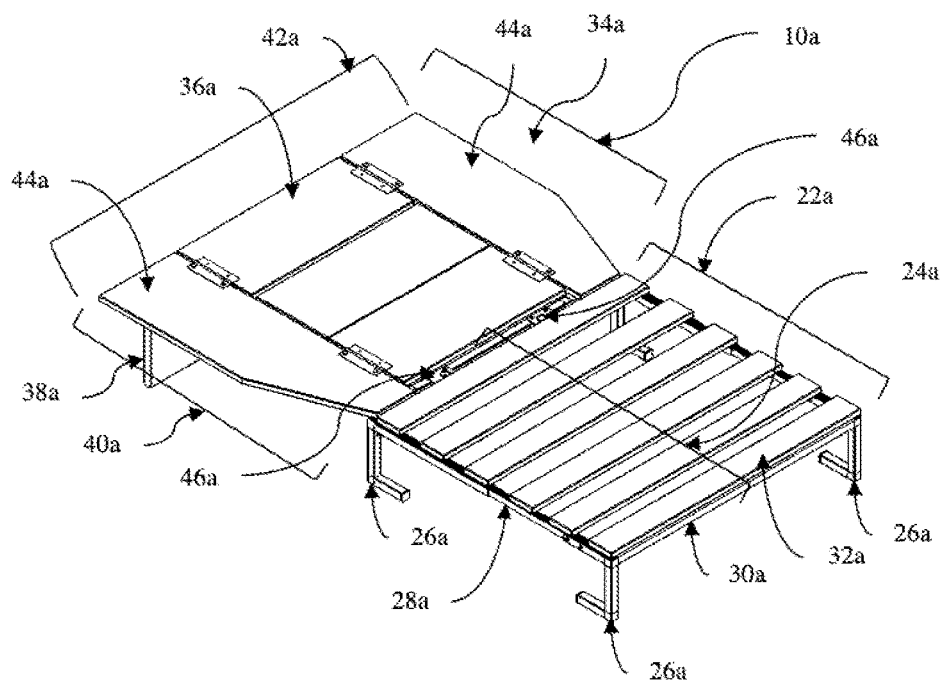
FIG. 23 illustrates one embodiment of the adjustable platform with the front supports being longer.
Figure 24:
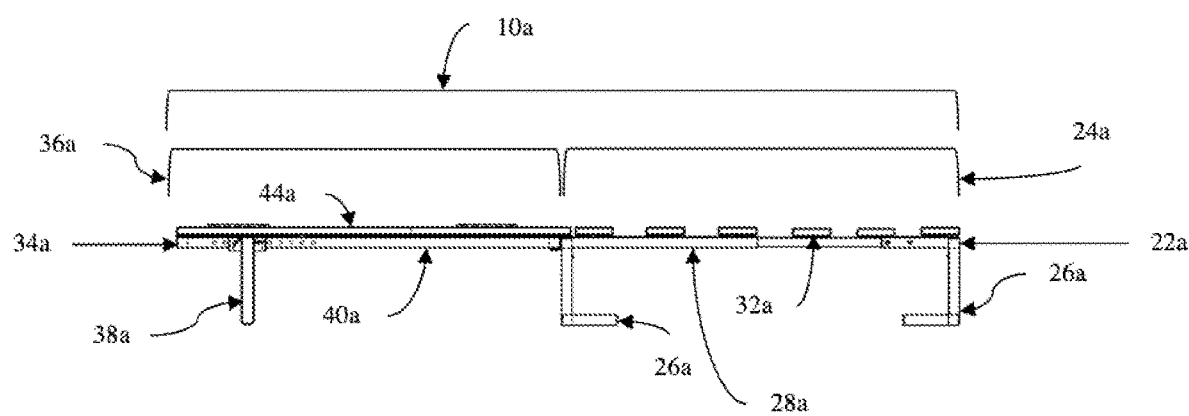
FIG. 24 illustrates horizontal, side view of the adjustable platform of FIG. 23 to show that the longer front supports are the same height as the rear supports.
Figure 25:
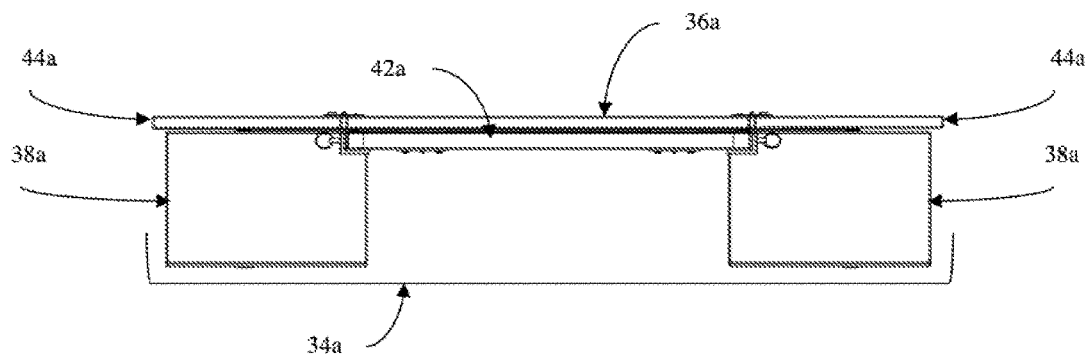
FIG. 25 illustrates a horizontal, front view of the adjustable platform of FIG. 23 with the legs of the platform not being visible due to the longer length of the front supports.

As best understood by comprising FIGS. 1 through 7, the platform 10 also comprises a front portion 34 that further comprises a front upper platform surface 36 and at least one front support 38 under the front upper platform surface 36 and upon the folded rear seats 16. The front portion 34 has a second length 40 and a second width 42 that each extend across the folded rear seat surface 20 and at least one front support 38. As best understood by comparing FIGS. 3 and 4, the front support 38 is positionable under the front portion 34 and along the second length 40. The front support 38 allows for the platform 10 to accommodate different angles of the folded rear seats 16 so that the platform 10 does not require a completely flat rear seat surface 20 to be installed and used. Specifically, the position of the front support 38 on the folded rear seat surface 20 is adjustable to accommodate folded rear seats 16 that lie at different angles. FIGS. 3 and 4 also show that the front upper platform surface 36 and the rear upper platform surface 24 can combine to create an approximately flat continuous surface regardless of the angle of the folded rear seats 16 due to the different positioning of the front support 38. The front support 38 may have different lengths as shown in comparing FIGS. 7 and 23, which may help in creating the approximately flat continuous surface regardless of the angle of the folded rear seats 16.

Figure 8:
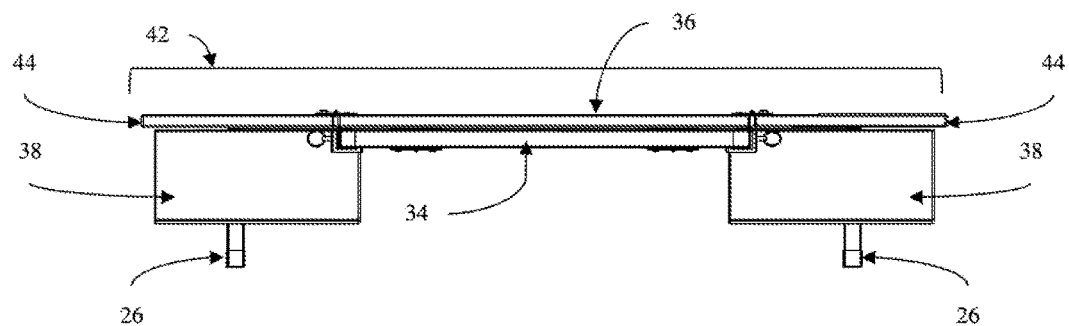
FIG. 8 illustrates a horizontal, front view of the adjustable platform of FIG. 5 with the legs of the platform being visible due to the shorter length of the front supports.
Figure 9:
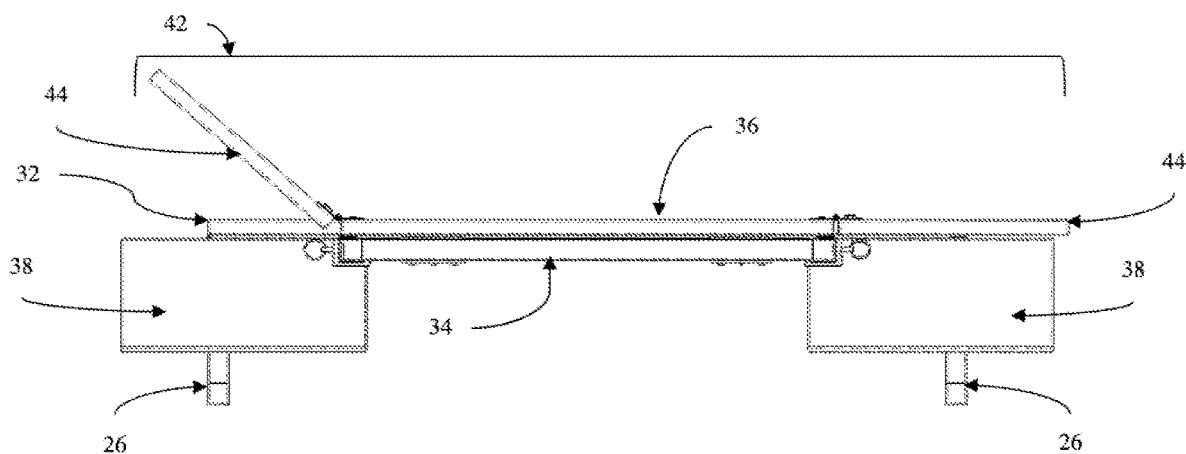
FIG. 9 illustrates the view of the adjustable platform of FIG. 5, but with one of the wings being angled upward and the other wing remaining flat.

As best understood by comparing FIGS. 1 through 22 the platform also comprises at least one wing 44 that adjusts the second width 42 of the front portion 34. These figures show two wings 44 supported by a front support 38 of the front portion 34. However, it is understood that in other embodiments not shown, the wing or wings 44 may be unsupported or rest on other interior features of the vehicle 12. Moreover, the wings 44 can angle to a maximum 180 degrees relative to the front upper platform surface 36 as shown by comparing FIGS. 8 and 10 with 9 and 11.

Figure 10:
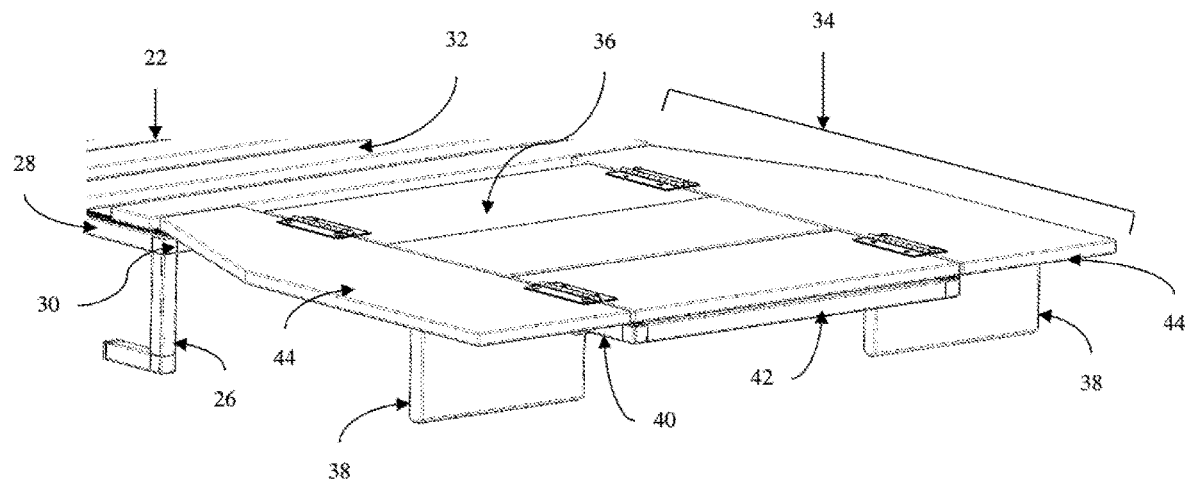
FIG. 10 illustrates a close-up view of the front portion of the adjustable platform of FIG. 5.
Figure 11:
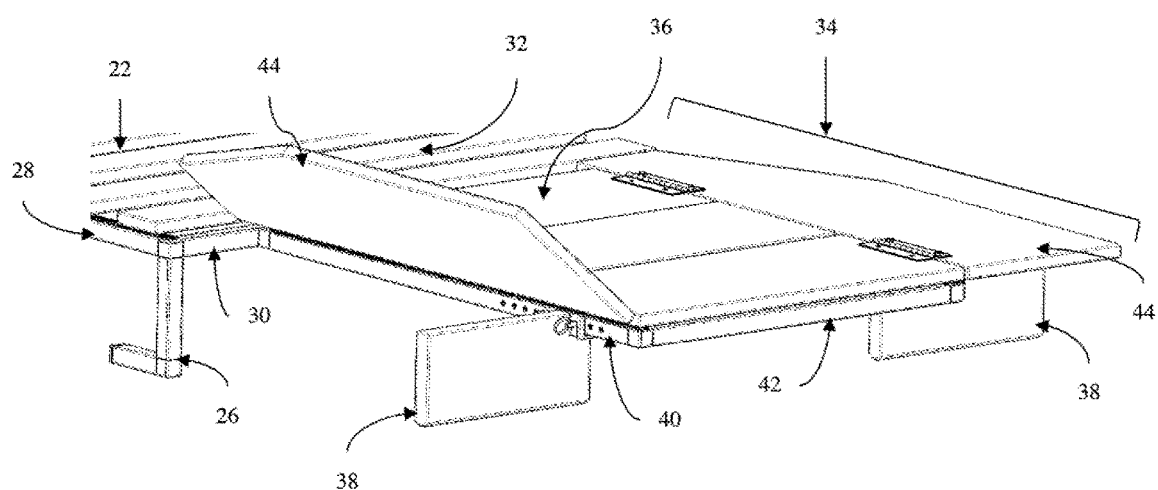
FIG. 11 illustrates a illustrates the same view of the front portion of the adjustable platform of FIG. 10, but with one of the wings being angled upwards and the other wing remaining flat.
Figure 12:
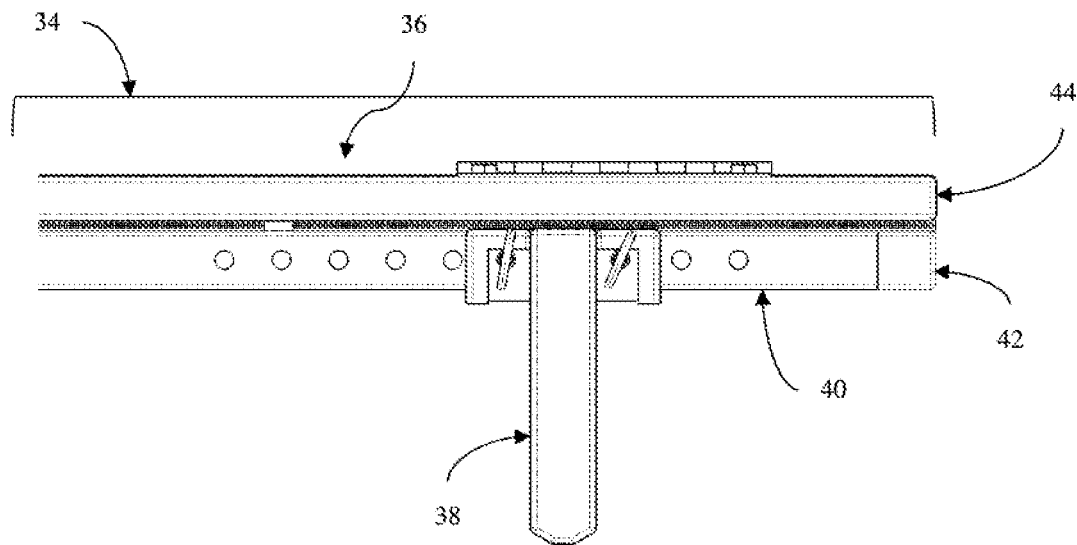
FIG. 12 illustrates a close-up view of the front support attached to the adjustable platform of FIG. 5.
Figure 13:
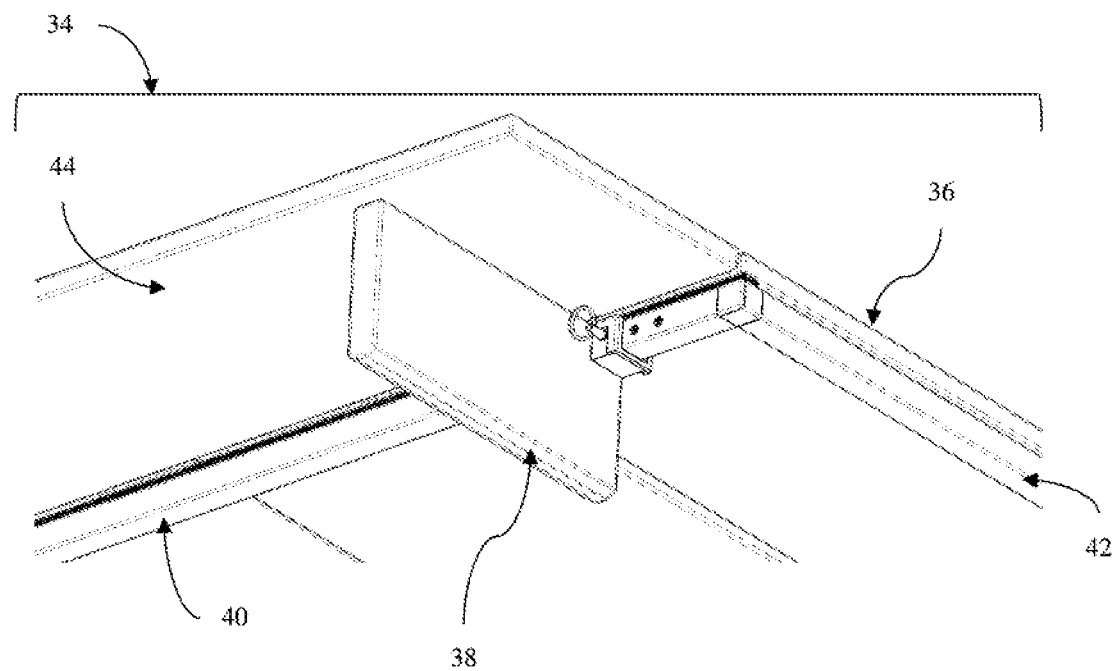
FIG. 13 illustrates an underside view of the close-up view of the front support attached to the adjustable platform of FIG. 5.
Figure 14:
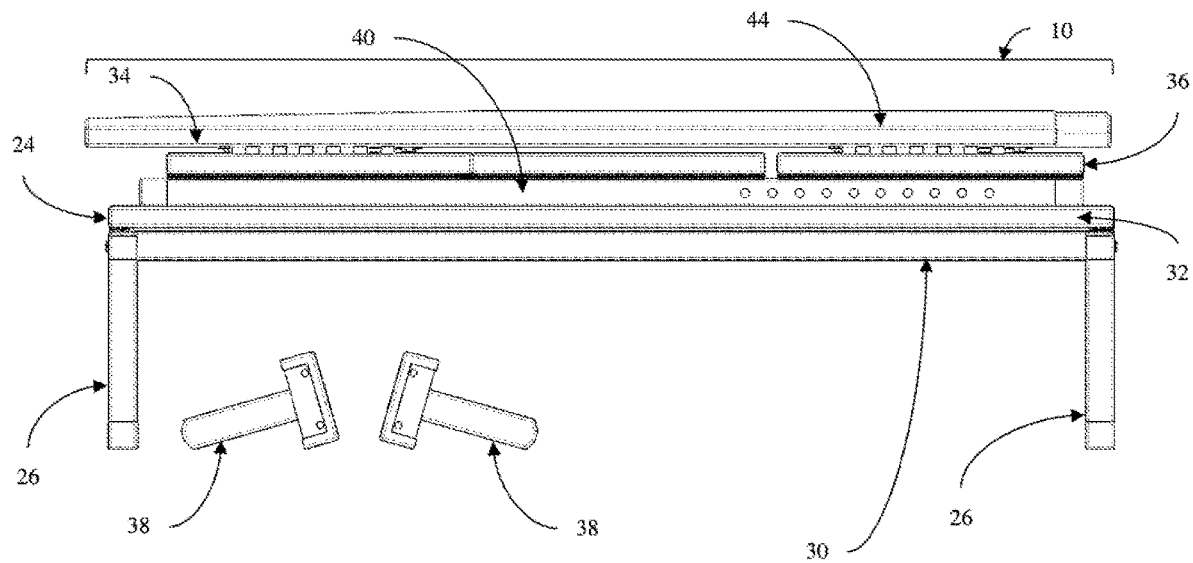
FIG. 14 illustrates one embodiment of the adjustable platform with the front portion resting on top of the rear portion and the front supports detached.
Figure 15:
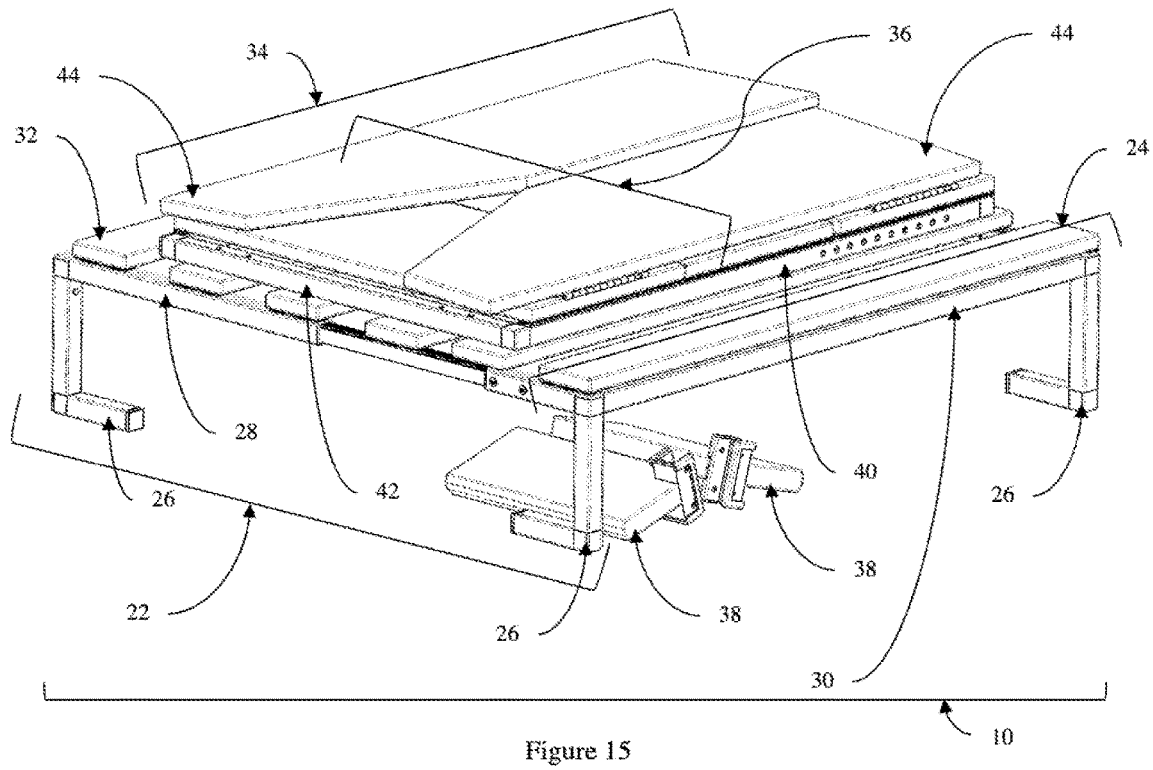
FIG. 15 illustrates another view of the adjustable platform in FIG. 14.
Figure 16:
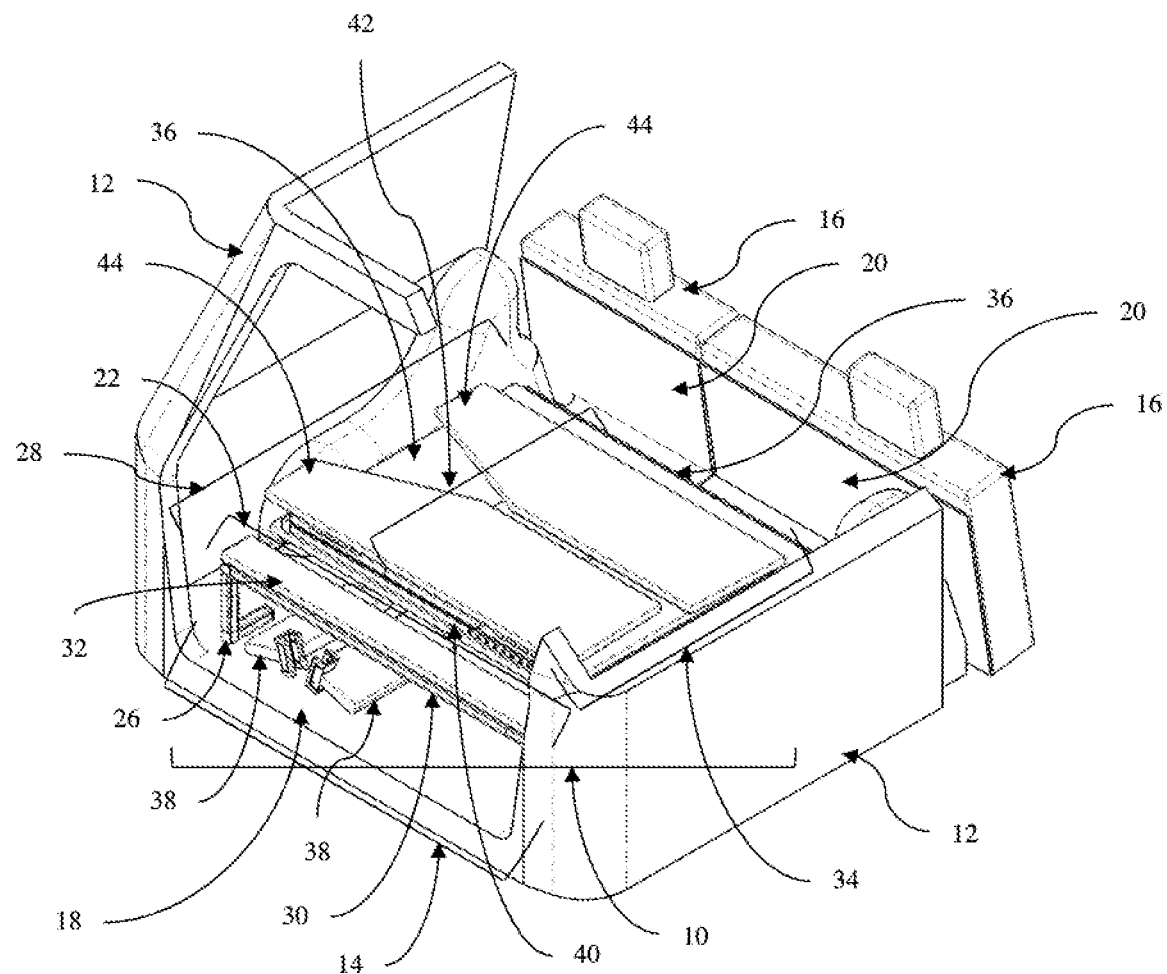
FIG. 16 illustrates another view of the adjustable platform of FIG. 14 installed in the trunk space of a vehicle.
Figure 17:
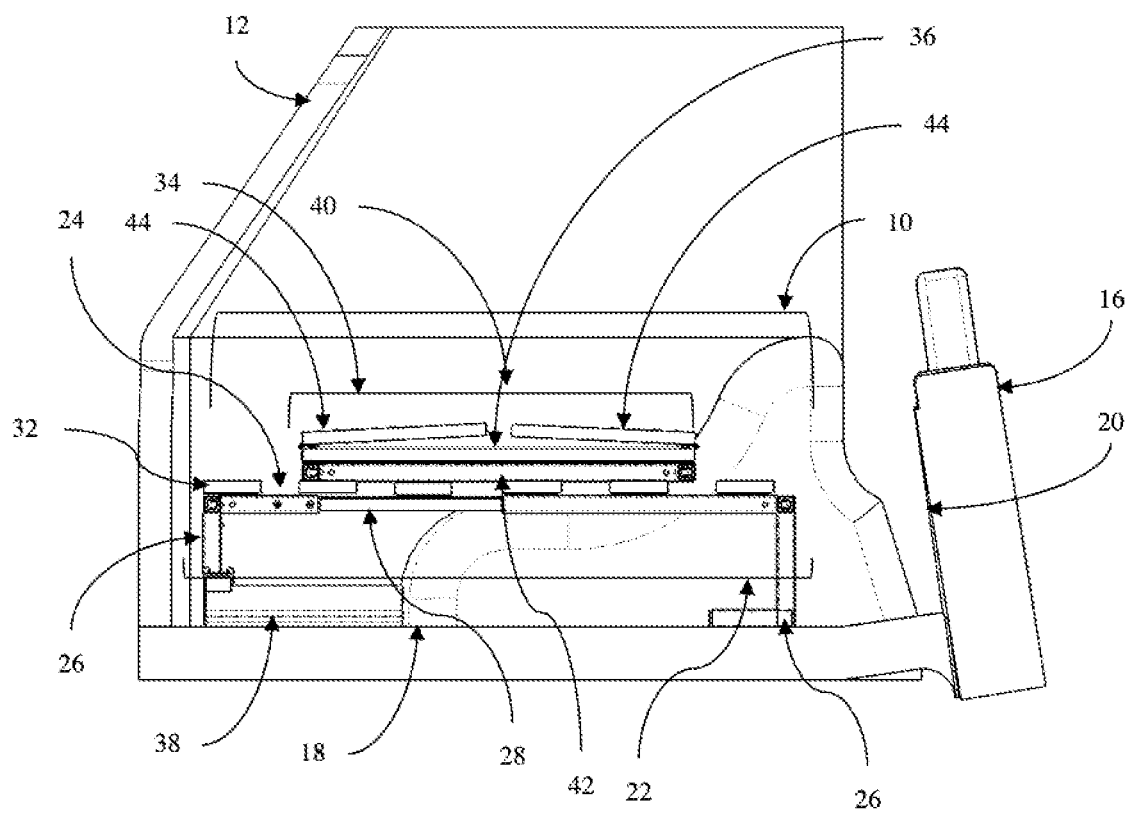
FIG. 17 illustrates another view of the adjustable platform of FIG. 14 installed in the trunk space of a vehicle.
Figure 21:
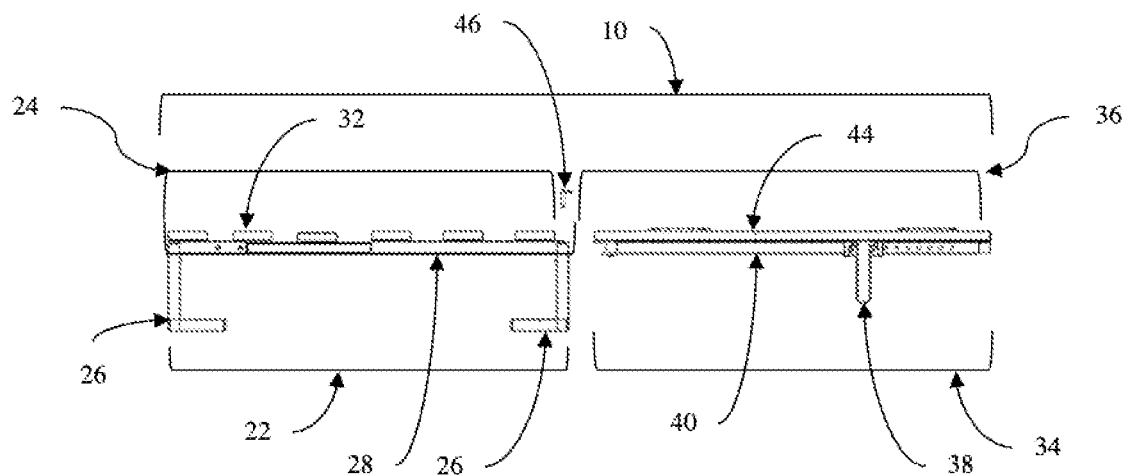
FIG. 21 illustrates the same view of the adjustable platform of FIG. 7, but with the front portion and rear portions detached from each other.
Figure 22:
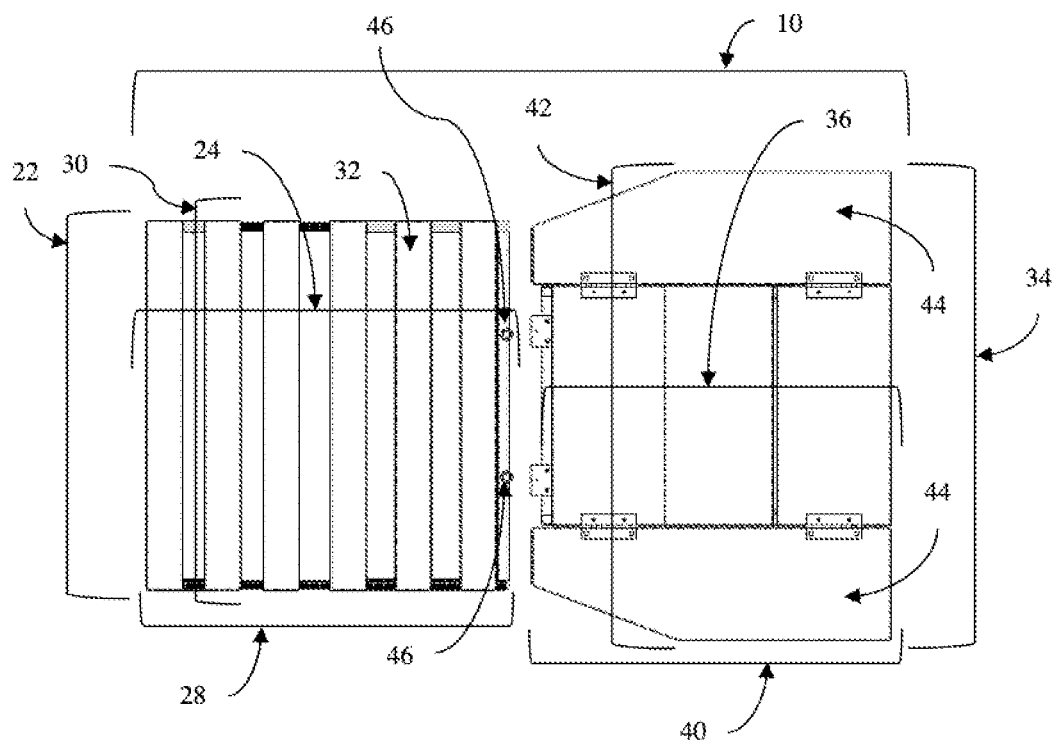
FIG. 22 illustrates the same view of the adjustable platform of FIG. 6, but with the front portion and rear portions detached from each other.

In this embodiment, the platform 10 comprises of a front portion 34 and a rear portion 22 that are detachably connected to each other with connectors 46 as shown in FIGS. 10 and 11. FIGS. 21 and 22 show the disassembly of the front portion 34 and the rear portion 22. Many types of connectors 46 are possible including pins, screws, etc. The detachable connection of the front portion 34 and the rear portion 22, along with the second length 40 and second width 42 being less than the first length 28 and the first width 30, allows the front portion 34 to be positioned above the rear portion 22 for storage as shown in FIGS. 14 through 17. These figures show that the front supports 38 are detached and stored underneath the rear portion 22. The attachment of the front supports 38 to the front portion 34 is better understood by FIG. 13. FIGS. 16 and 17 specifically show the storage of the front portion 34 disassembled and on top of the rear portion 22 in the trunk space 14 of the vehicle 12.

Figure 26:
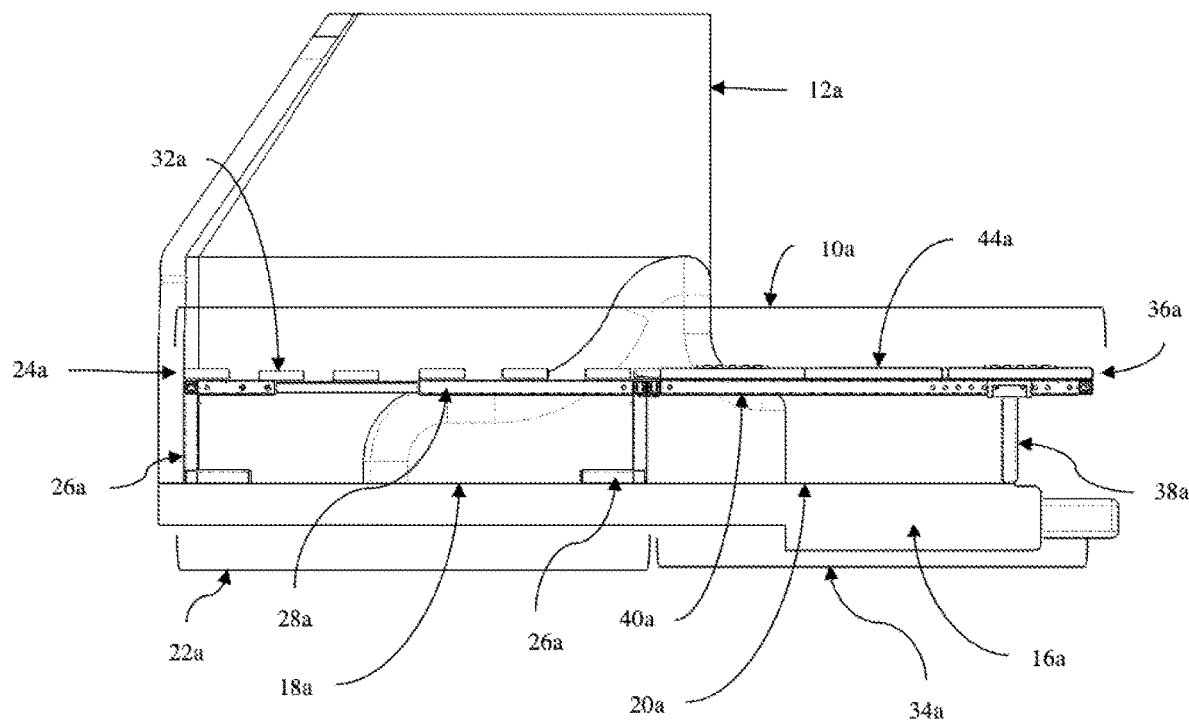
FIG. 26 illustrates a horizontal, side view of the adjustable platform of FIG. 23 installed in the trunk space and with the folded rear seats being completely flat.

In a different embodiment, FIGS. 23 through 26 show the platform 10a with the front support 38a being longer than in the previous embodiment. This allows for further accommodation of varying angles of the folded rear seat 16a. As shown in FIG. 26, the vehicle 12a has rear seats 16a that fold completely flat or for pickup trucks that have no seats. In this embodiment, the front support 38a are as tall as the rear supports 26a and allows the space for storage under the platform 10a to extend across the trunk space 14a and across the flat folded rear seat surface 20a, unlike when there is an angle with the folded read seats 16a.

Figure 27:
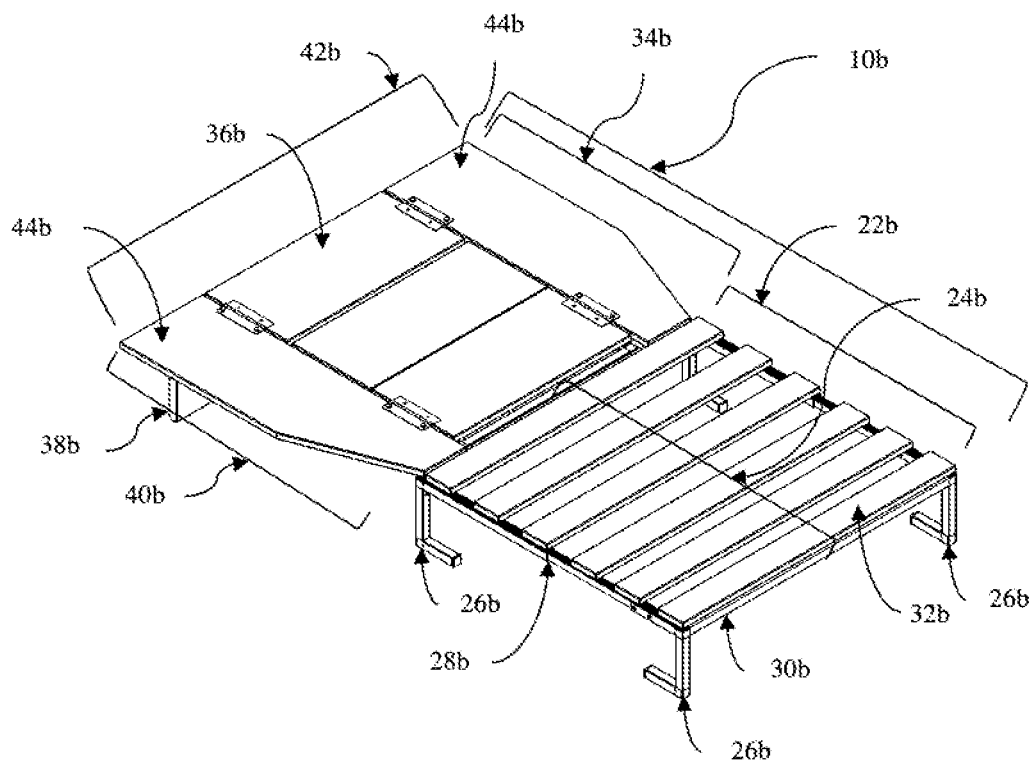
FIG. 27 illustrates one embodiment of the adjustable platform with the rear portion and the front portion being permanently attached to each other.
Figure 28:
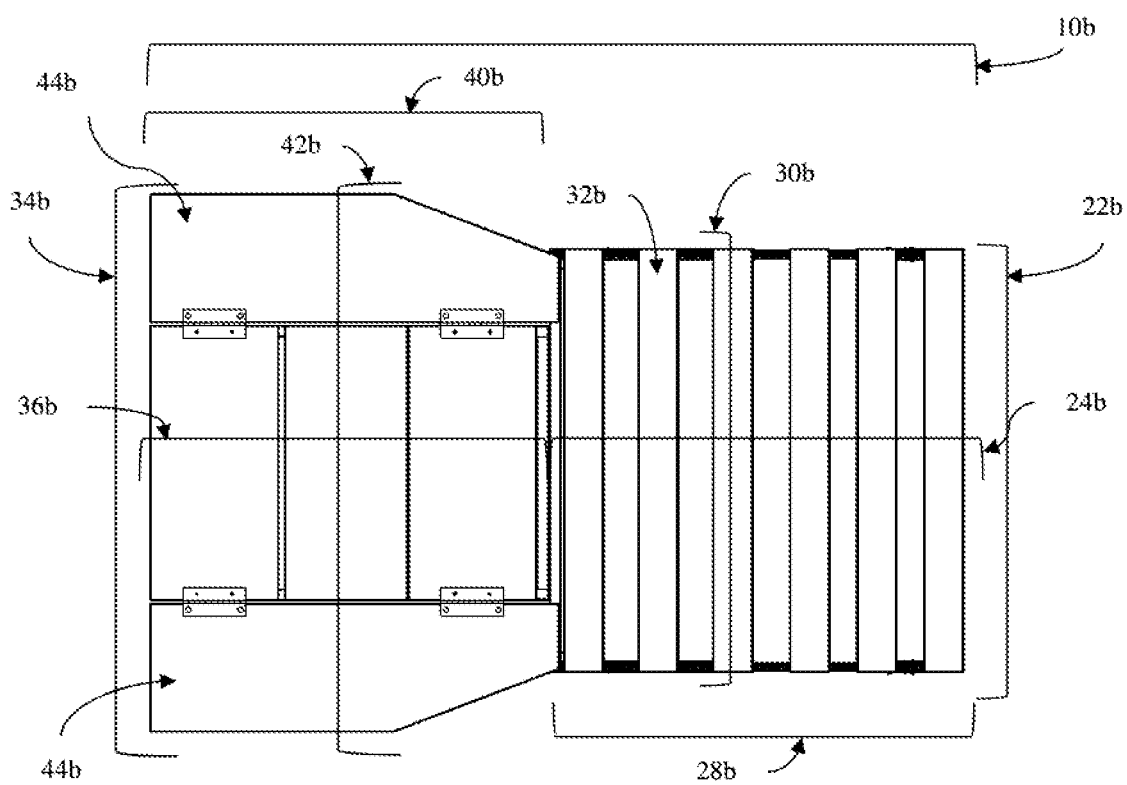
FIG. 28 illustrates another view of the adjustable platform of FIG. 27.
Figure 29:
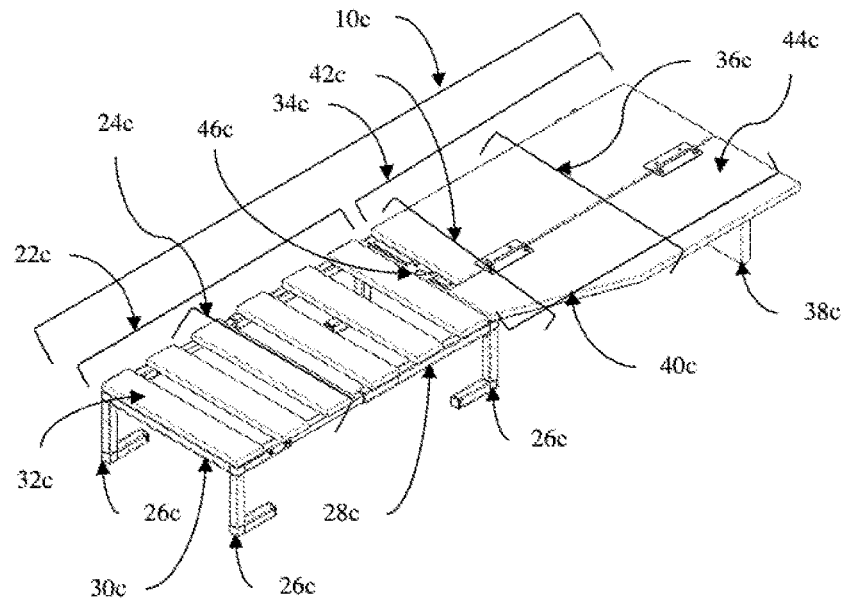
FIG. 29 illustrates one embodiment of the adjustable platform with only one wing and connectors allowing the rear portion and the front portion to be separated.
Figure 30:
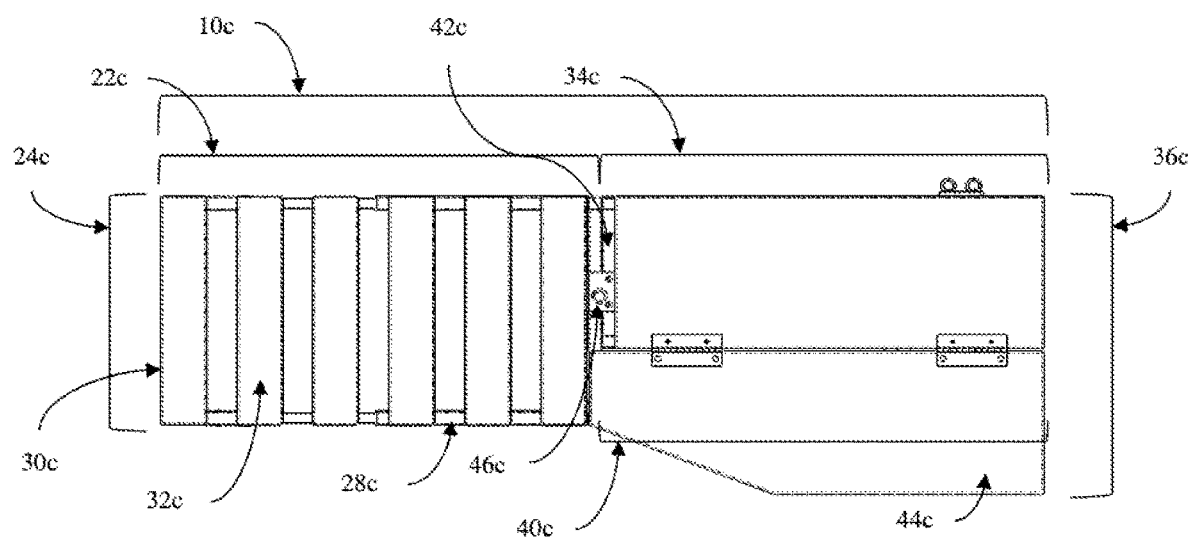
FIG. 30 illustrates another view of the adjustable platform of FIG. 29.
Figure 31:
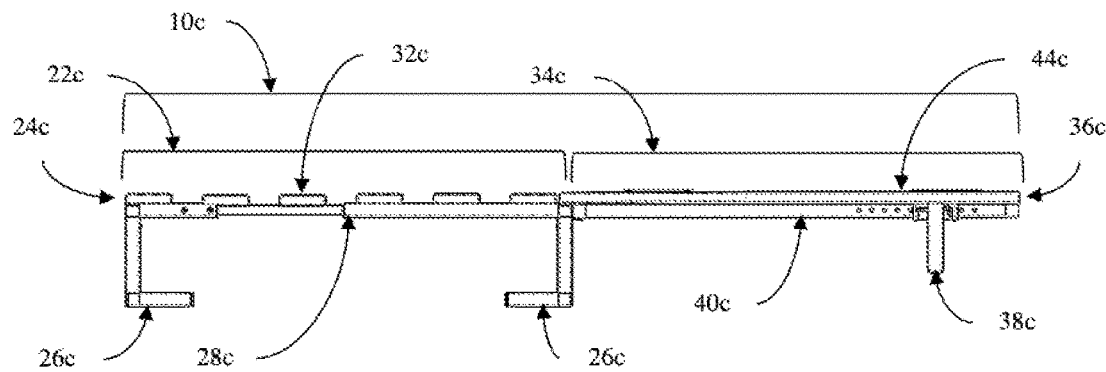
FIG. 31 illustrates a horizontal side view of the adjustable platform in FIG. 29 with shorter front supports.
Figure 32:
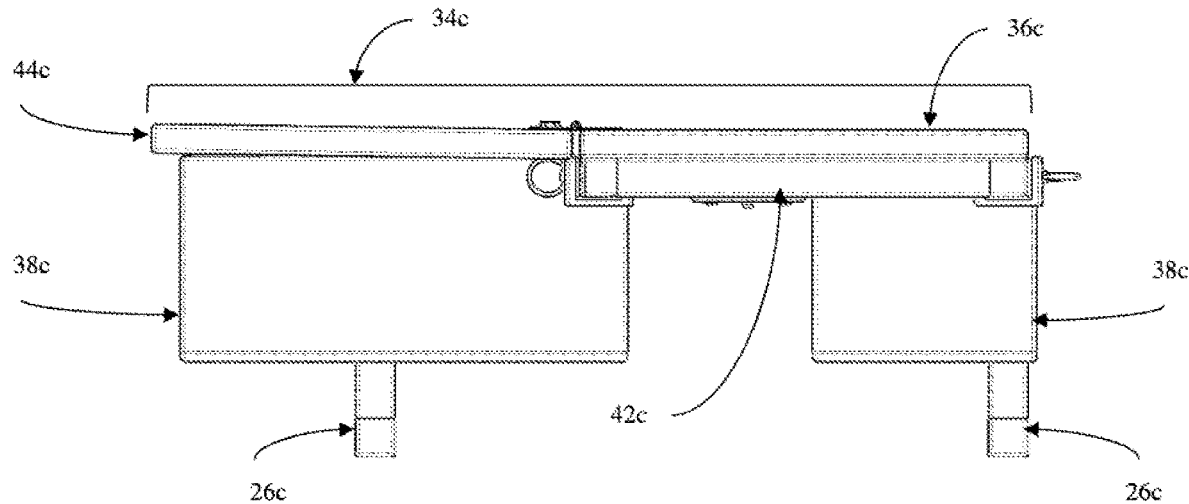
FIG. 32 illustrates a horizontal front view of the adjustable platform of FIG. 29 with the legs of the platform being visible due to the shorter length of the front supports.

In another embodiment, the platform 10b comprises of a front portion 34b and a rear portion 22b that are permanently attached to each other as shown in FIGS. 27 and 28. In this embodiment, the platform 10b is permanently installed on the folded rear seats 16b of the vehicle 12b (not shown). This embodiment is ideal for flat bed pickup trucks and does not require much adjustment or assembly before use.

Figure 33:
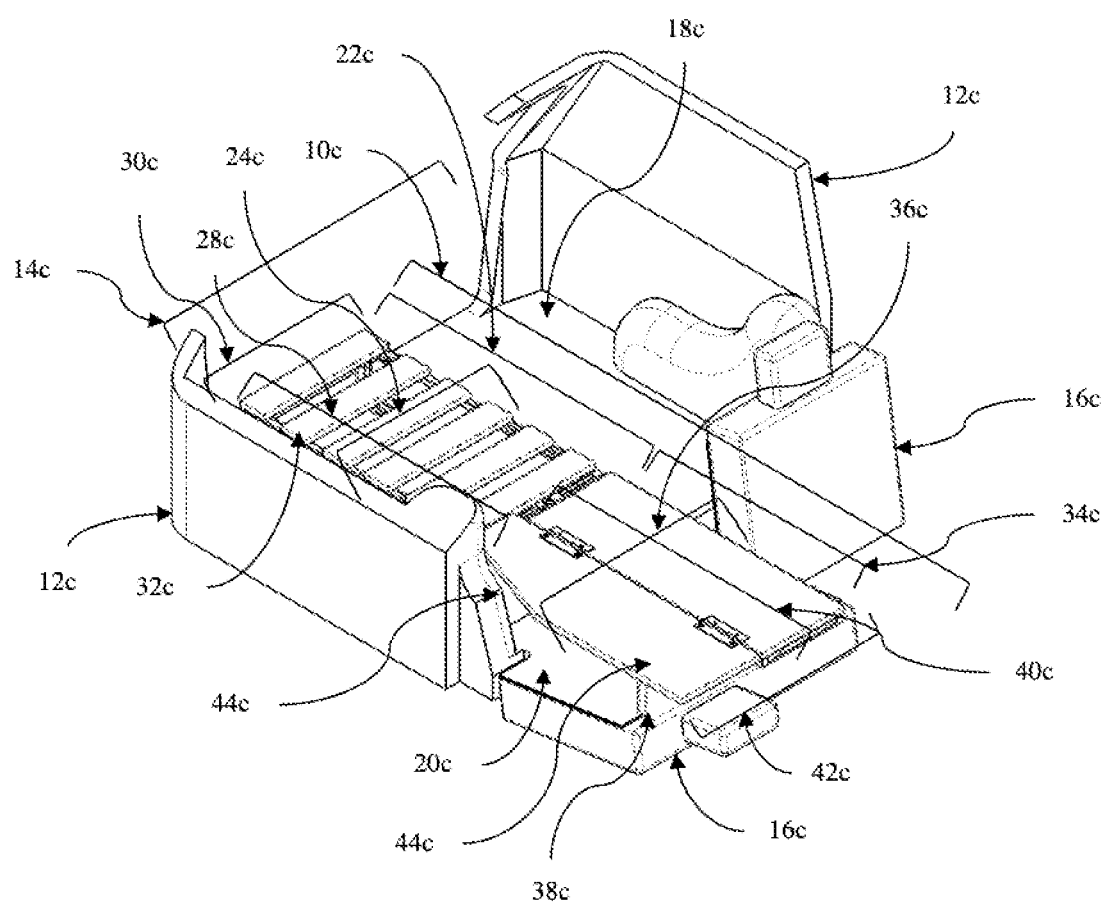
FIG. 33 illustrates another view of the adjustable platform in FIG. 29 installed in the trunk space and on one folded rear set in a vehicle.
Figure 34:
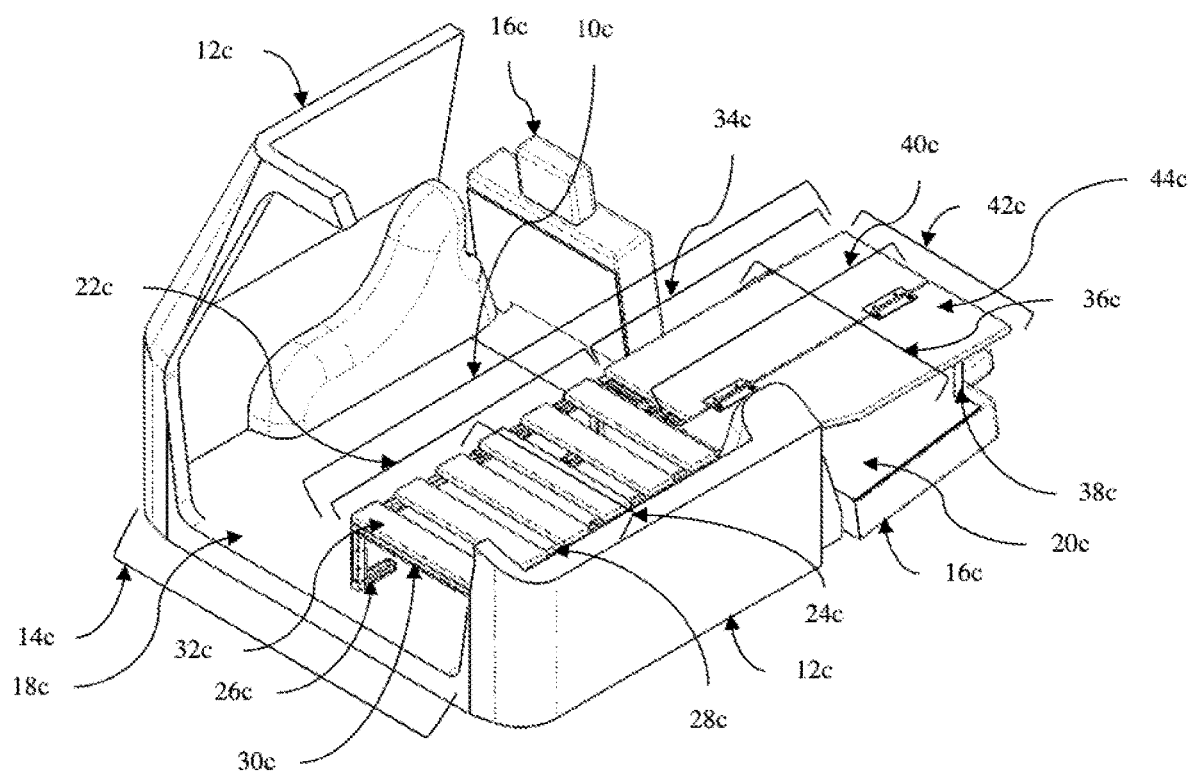
FIG. 34 illustrates another view of the adjustable platform in FIG. 29 installed in the trunk space and on one folded rear seat in a vehicle.

In a different embodiment, FIGS. 29 through 34 show the platform 10c as half the size of the previous embodiments. This embodiment accommodates a single user and allow for more vehicle 12e space to be used for storage. This embodiment of platform 10e only has one wing 44c which would be typically oriented away from the upright seat 16c as shown in FIGS. 33 and 34.

Figure 35:
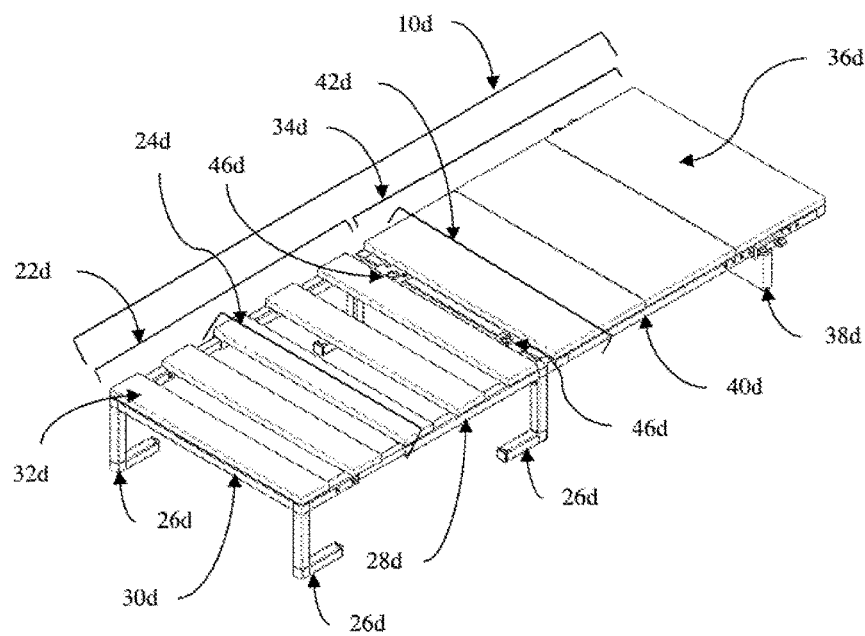
FIG. 35 illustrates one embodiment of the adjustable platform with no wings and connectors allowing the rear portion and the front portion to be separated.
Figure 36:
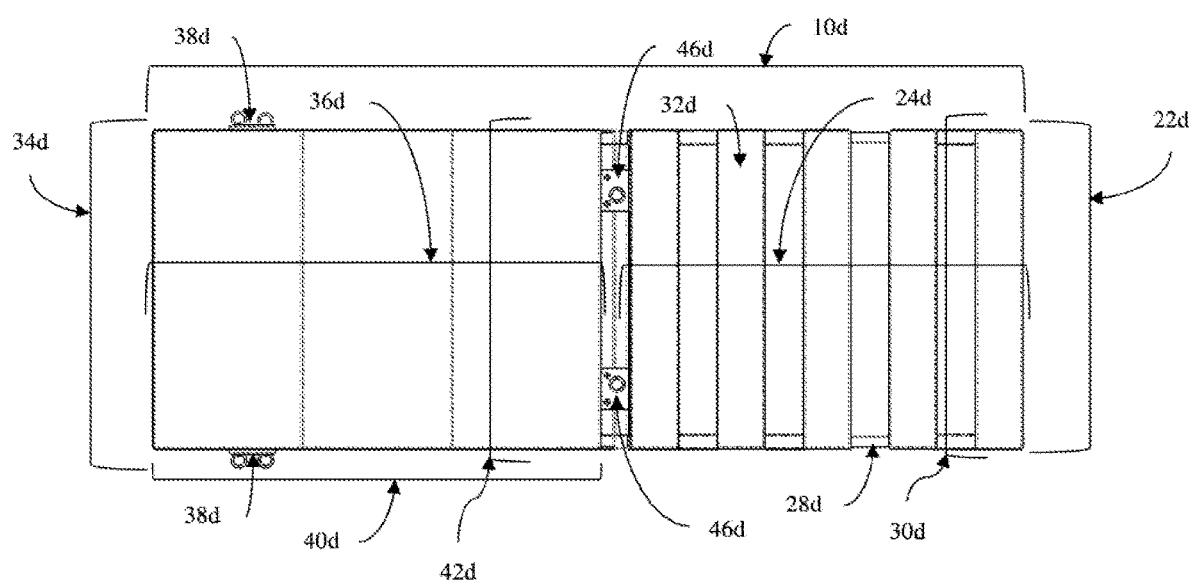
FIG. 36 illustrates another view of the adjustable platform in FIG. 35.
Figure 37:
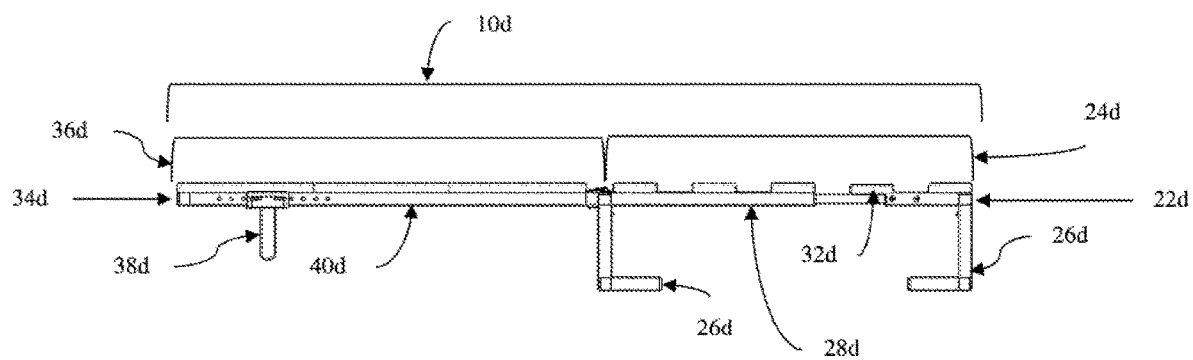
FIG. 37 illustrates a horizontal side view of the adjustable platform in FIG. 35 with shorter front supports.
Figure 38:
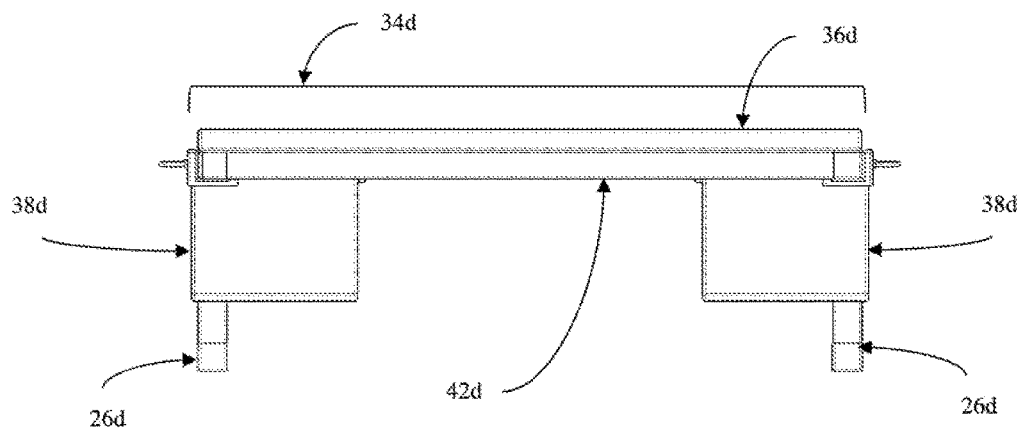
FIG. 38 illustrates a horizontal, front view of the adjustable platform of FIG. 35 with the legs of the platform being visible due to the shorter length of the front supports.
Figure 39:
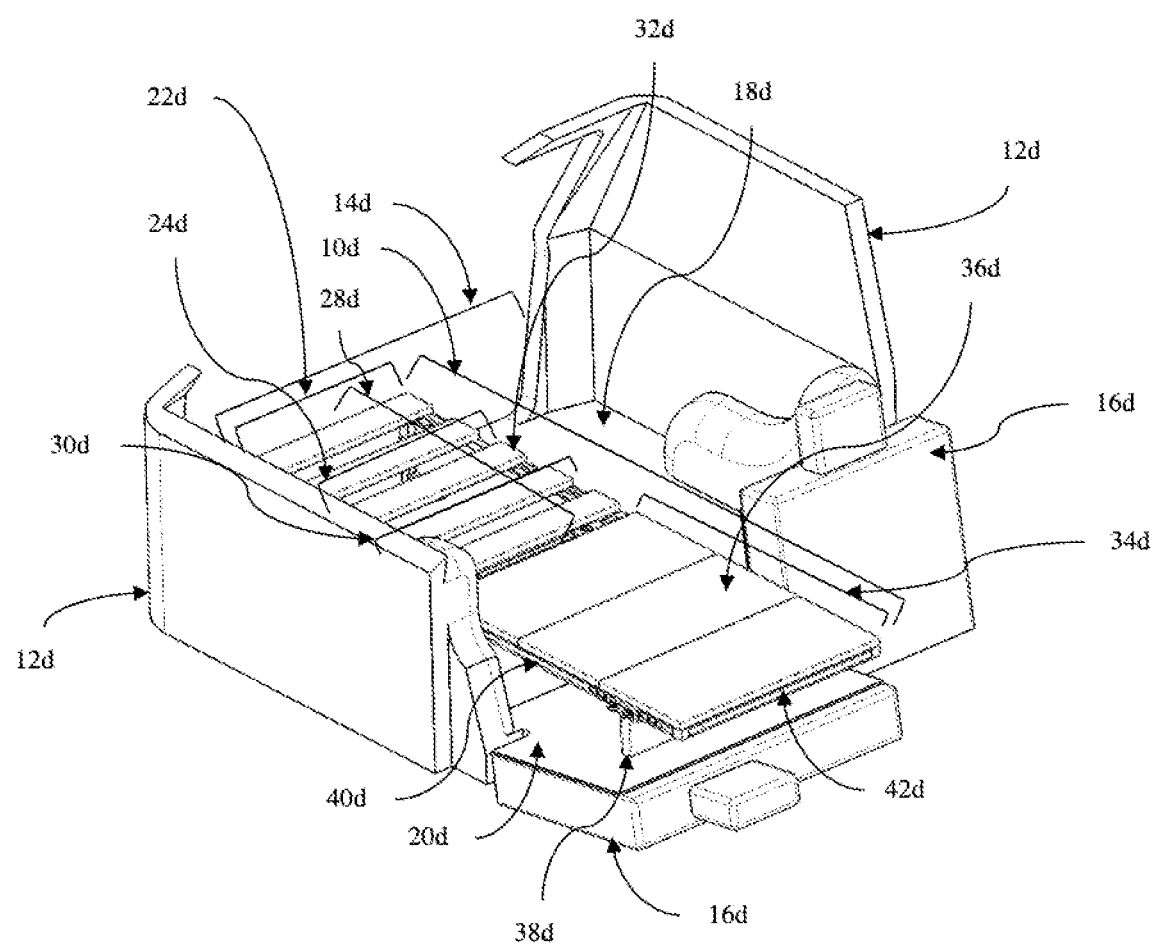
FIG. 39 illustrates another view of the adjustable platform of FIG. 35 installed in the trunk space with one folded rear seat and one standing rear seat.
Figure 40:
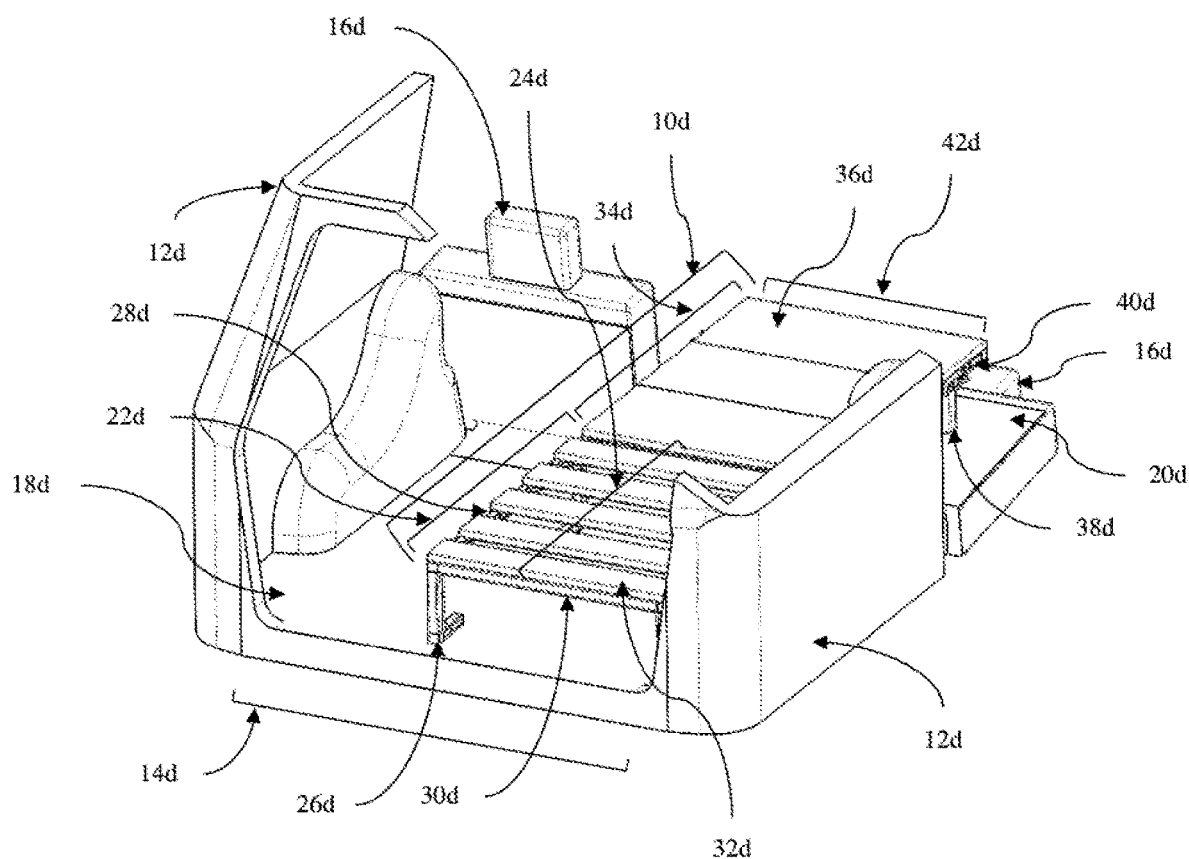
FIG. 40 illustrates another view of the adjustable platform of FIG. 35 installed in the trunk space.

In another embodiment, FIGS. 35 through 40 show the platform 10d as the same size as the previous embodiment. However, this embodiment has no wing so that the front portion 34d has a fixed first width 30d unlike prior embodiments as shown in FIGS. 35 and 36. This embodiment has a front portion 34d and a rear portion 22d with the front portion 34d having at least one front support 38d that rests under the front upper platform surface 36d, but only on a single folded rear seat 16d as shown in FIGS. 39 and 40. This embodiment accommodates a single user and allows for more vehicle 12*d* space to be used for storage. The detachable connection between the front portion 34*d* and the rear portion 22*d* is still present in this embodiment, which allows for storage in the trunk space 14*d* (not shown).

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

The invention claimed is:

1. A platform for the rear of a vehicle, wherein the vehicle comprises a trunk space and rear seats that are foldable, the trunk space having a flat trunk surface, and the rear seats folding down to create an approximately flat folded rear seat surface, the platform comprising:
    a rear portion positionable within the trunk space, and comprising a rear upper platform surface raised by at least one rear support under said rear upper platform surface, said rear portion having a first width and a first length that each extend across said trunk surface;
    a front portion comprising a front upper platform surface raised by at least one front support under said front upper platform surface, said front portion having a second length and a second width that each extend across the folded rear seat surface;
    said front support rests upon the folded rear seat surface and is positionable along said second length so that said front upper platform surface and said rear upper platform surface combine to create an approximately flat continuous surface;
    at least one wing mounted to said front portion that adjusts the width of said front portion by angling to a maximum of 180 degrees relative to said front upper platform surface; and
    said first length is adjustable using removable slats perpendicular to said rear supports and to accommodate for adjustment of the rear supports.

2. The platform of claim 1, further comprising said at least one rear support is one of a leg, a pole, a board, or a caster.

3. The platform of claim 1, further comprising said front portion and said rear portion are detachably connected to each other or permanently attached to each other.

4. The platform of claim 1, further comprising said front portion is positionable on top of said rear portion, creating a storage rack.

5. The platform of claim 1, further comprising at least one said wing is supported by said at least one front support of said front portion.

6. The platform of claim 1, further comprising two said wings mounted to said front portion.

7. A platform for the rear of a vehicle, wherein the vehicle comprises a trunk space and rear seats that are foldable, the trunk space having a flat trunk surface, and the rear seats folding down to create an approximately flat folded rear seat surface, the platform comprising:
    a rear portion positionable within the trunk space, and comprising a rear upper platform surface raised by at least one rear support under said rear upper platform surface, said rear portion having a first width and a first length that each extend across said trunk surface;
    a front portion comprising a front upper platform surface raised by at least one front support under said front upper platform surface, said front portion having a second length and a second width that each extend across the folded rear seat surface;
    said front support rests upon the folded rear seat surface and is positionable along said second length so that said front upper platform surface and said rear upper platform surface combine to create an approximately flat continuous surface; and
    said first length is adjustable using removable slats perpendicular to said rear supports and to accommodate for adjustment of the rear supports.

8. The platform of claim 7, further comprising said at least one rear support is one of a leg, a pole, a board, or a caster.

9. The platform of claim 7, further comprising said front portion and said rear portion are detachably connected to each other or permanently attached to each other.

10. The platform of claim 7, further comprising said front portion is positionable on top of said rear portion, creating a storage rack.

* * * * *